US009847039B2

(12) United States Patent
Guo et al.

(10) Patent No.: US 9,847,039 B2
(45) Date of Patent: Dec. 19, 2017

(54) COMPUTER-IMPLEMENTED METHOD OF ADMINISTERING AND SCORING INTEGRATED REASONING QUESTION FORMATS

(71) Applicant: Graduate Management Admission Council, Reston, VA (US)

(72) Inventors: Fanmin Guo, Gaithersburg, MD (US); Gloria Drapac, Iowa City, IA (US); Theresa Biancheri, Iowa City, IA (US); Nancy Petersen, Iowa City, IA (US); Jie Li, Iowa City, IA (US); Ann (Chunxin) Wang, Iowa City, IA (US)

(73) Assignee: Graduate Management Admission Council, Reston, VA (US)

( * ) Notice: Subject to any disclaimer, the term of this patent is extended or adjusted under 35 U.S.C. 154(b) by 278 days.

(21) Appl. No.: 14/182,907

(22) Filed: Feb. 18, 2014

(65) Prior Publication Data

US 2014/0234825 A1 Aug. 21, 2014

Related U.S. Application Data

(60) Provisional application No. 61/766,428, filed on Feb. 19, 2013.

(51) Int. Cl.
*G09B 3/00* (2006.01)
*G09B 7/00* (2006.01)

(52) U.S. Cl.
CPC .................................... *G09B 7/00* (2013.01)

(58) Field of Classification Search
USPC ........................................ 434/322, 323, 350
See application file for complete search history.

(56) References Cited

U.S. PATENT DOCUMENTS

| 6,234,806 | B1 | 5/2001 | Trenholm et al. | |
| 7,513,775 | B2 | 4/2009 | Foster | |
| 2002/0182578 | A1* | 12/2002 | Rachman | G09B 5/06 434/350 |

OTHER PUBLICATIONS

Wikipedia entry for "Differential item functioning (DIF)," last modified Dec. 28, 2012, 13 pages.

(Continued)

*Primary Examiner* — Kesha Frisby
(74) *Attorney, Agent, or Firm* — Panitch Schwarze Belisario & Nadel LLP

(57) ABSTRACT

Automated methods and systems are provided for presenting and scoring items which are presented in different question formats that include graphics interpretation, two-part analysis, table analysis, and multi-source reasoning. There are a plurality of response opportunities for each item, and each response opportunity is independent of each other. In operation, an item is presented in the respective question format on a processor-controlled user interface display screen. A response engine receives the response for each response opportunity. A scoring engine in communication with the response engine receives the plurality of responses and scores the plurality of responses by determining whether the response selected for each response opportunity is correct, and assigning credit for the item only if each of the responses for each of the response opportunities is correct, and assigning no credit for the item if at least one of the responses for each of the response opportunities is incorrect.

12 Claims, 33 Drawing Sheets

(56) References Cited

OTHER PUBLICATIONS

Integrated Reasoning (IR) section excerpt pages from GMAT administered Jul./Aug. 2011—IR Section (Jul./Aug. 2011 Public Testing Examples), 3 pages.

Integrated Reasoning (IR) section excerpt pages from GMAT administered Jan. 2012—IR Section (Jan. 2012 Field Testing Examples), 3 pages.

* cited by examiner

400 →

Calculator

Sort By: Airport City
Select:
- Airport City
- Airport Country
- Airport Code
- Passengers Number
- Passengers % change
- Passengers Rank
- Movements Number
- Movements % change
- Movements Rank

| City | Airport Country | Airport Code | Passengers Number | Passengers % change | Passengers Rank | Movements Number | Movements % change | Movements Rank |
|---|---|---|---|---|---|---|---|---|
| Amsterdam | | | ,430,019 | -0.8 | 14 | 446,592 | -1.7 | 17 |
| Atlanta | | | ,039,280 | 0.7 | 1 | 978,824 | -1.6 | 1 |
| Beijing | | | ,937,289 | 4.4 | 8 | 431,670 | 8.0 | 21 |
| Charlotte | | | ,739,020 | 4.7 | 26 | 536,253 | 2.6 | 9 |
| Chicago | | | ,353,876 | -9.0 | 2 | 881,566 | -4.9 | 2 |
| Dallas/Ft W | | | ,093,187 | -4.5 | 7 | 656,310 | -4.3 | 3 |
| Denver | USA | DEN | 51,245,334 | 2.8 | 10 | 619,503 | 0.9 | 5 |
| Detroit | USA | DTW | 35,135,828 | -2.4 | 24 | 462,520 | -1.0 | 15 |
| Frankfurt | DEU | FRA | 53,467,450 | -1.3 | 9 | 485,783 | 1.4 | 12 |
| Houston | USA | IAH | 41,709,389 | -3.0 | 16 | 576,062 | -4.6 | 7 |
| Las Vegas | USA | LAS | 43,208,724 | -8.0 | 15 | 578,949 | -5.0 | 6 |
| London | GBR | LHR | 67,056,379 | -1.5 | 3 | 478,518 | -0.6 | 13 |
| Los Angeles | USA | LAX | 59,497,539 | -4.7 | 6 | 622,506 | -8.6 | 4 |
| Madrid | ESP | MAD | 50,824,435 | -2.4 | 11 | 469,740 | -2.6 | 14 |
| Miami | USA | MIA | 34,063,531 | 1.0 | 29 | 371,519 | -3.8 | 29 |
| Minneapolis | USA | MSP | 34,056,443 | -3.0 | 30 | 450,044 | -0.7 | 16 |
| Munich | DEU | MUC | 34,530,593 | 1.7 | 27 | 432,296 | 0.1 | 20 |
| Newark | USA | EWR | 35,360,848 | -2.8 | 23 | 434,428 | -0.4 | 19 |
| Paris | FRA | CDG | 60,874,681 | 1.6 | 5 | 559,816 | 1.3 | 8 |
| Phoenix | USA | PHX | 39,891,193 | -5.4 | 17 | 502,499 | -6.8 | 10 |
| San Francisco | USA | SFO | 37,234,592 | 4.7 | 21 | 387,710 | 2.2 | 24 |

402 →

The table above gives information for 2008 on total passengers (total passengers enplaned and deplaned with passengers in transit counted once) and total movements (landing and takeoff of an aircraft) for 21 airports throughout the world. The 21 airports were chosen for inclusion in the table because, in 2008, each was among the busiest 30 airports in the world in terms of both total passengers and total movements. In addition to the numbers of total passengers and total movements for each airport, the table also gives the percent of increase and decrease over the numbers for 2007 and the rank of the airport for total passengers and total movements.

404 →

Help | Show Answer | Next →

Each column of the table can be sorted in ascending order by clicking on the word "Select" above the table and choosing, from the drop-down menu, the heading of the column on which you want the table to be sorted.

Consider each of the following statements about these airports. For each statement indicate whether the statement is true or false, based on the information provided in the table.

True False

○  ○   The airport experiencing the greatest percent decrease in total passengers from 2007 to 2008 also experienced the greatest decrease in the percent of movements.

●  ○   The airport with the median rank based on total number of passengers is the same as the airport with the median rank based on total number of movements.

○  ●   Exactly 50% of the airports that experienced an increase in both total number of passengers and in total number of movements are located in the United States (USA).

406 (bracket around the three statements)
408 → (pointing to the True/False options)

Figure 4

Calculator

Organization A currently has 1,050 members. Organization B currently has 1,550 members. The number of members of Organization A and the number of members of Organization B are increasing annually, each at its own constant rate. Analysts project that if each of these organizations maintains its constant annual rate of membership increase, five years from now they will for the first time have the same number of members, and in subsequent years Organization A will have more members than Organization B.

In the table below, identify a rate of increase, in members per year, for Organization A and a rate of increase, in members per year, for Organization B that together are consistent with the analysts' projection. Make only one selection in each column.

| Organization A | Organization B | Rate of increase (members per year) |
|---|---|---|
| ○ | ○ | 10 |
| ○ | ◉ | 30 |
| ○ | ○ | 40 |
| ○ | ○ | 120 |
| ○ | ○ | 130 |
| ◉ | ○ | 150 |

Help  Show Answer                    Next →

Calculator

Email #1 ← 704

*Email from administrator to research staff*

January 15, 10:46 a.m.

Yesterday was the deadline for our receipt of completed surveys from doctors who were invited to participate in the Medical Practice Priorities Survey. Did we get enough returns from this original group of invitees to get reliable statistics? Do we need to invite additional participants?

⎫ 702

Consider each of the following statements. Does the information in the three emails support the inference as stated? ⎫ 706

Yes No

○ ○ The administrator is unwilling to invite as many participants in the second group as were invited in the first group.

⎫ 708

◉ ○ The project coordinator does not expect to be able to meet the goal for numbers of completed surveys received.

◉ ◉ The administrator is willing to accept some risk of exceeding the budget for compensating participants.

? Help | Show Answer | Next →

The Quasi JX is a new car model. Under ideal driving conditions, the Quasi JX's fuel economy is $E$ kilometers per liter ($E\frac{km}{L}$) when its driving speed is constant at $S$ kilometers per hour ($S\frac{km}{h}$).

In terms of the variables $S$ and $E$, select the expression that represents the number of liters of fuel used in 1 hour of driving under ideal driving conditions at a constant speed $S$, and select the expression that represents the number of liters of fuel used in a 60 km drive under ideal driving conditions at a constant speed $S$. Make only two selections, one in each column.

| Liters of fuel in 1 h | Liters of fuel in 60 km | |
|---|---|---|
| ○ | ○ | $\frac{S}{E}$ |
| ○ | ○ | $\frac{E}{S}$ |
| ○ | ○ | $\frac{60}{E}$ |
| ○ | ○ | $\frac{60}{S}$ |
| ○ | ○ | $\frac{S}{60}$ |
| ○ | ○ | $\frac{E}{60}$ |

Over a period of 5 academic years from Fall 1999 through Spring 2004, the number of faculty at a certain college increased despite a decrease in student enrollment from 5,500 students in Fall 1999.

In the given expressions, $F$ and $S$ represent the percent change in the number of faculty and students, respectively, over the 5 academic years, and $R$ represents the number of students per faculty member in Fall 1999. The percent change in a quantity $X$ is calculated using the formula $\left(\frac{X_{new} - X_{old}}{X_{old}}\right)(100)$.

Select the expression that represents the number of faculty in Fall 1999, and select the expression that represents the number of students per faculty member in Spring 2004. Make only two selections, one in each column.

| Number of faculty in Fall 1999 | Students per faculty member in Spring 2004 | |
|---|---|---|
| ○ | ○ | $5,500 \, R$ |
| ○ | ○ | $\frac{5,500}{R}$ |
| ○ | ○ | $\frac{1}{R}$ |
| ○ | ○ | $\left(\frac{100 + S}{100 + F}\right) R$ |
| ○ | ○ | $\left(\frac{100 - S}{100 + F}\right) R$ |
| ○ | ○ | $\left(\frac{100 - F}{100 - S}\right) R$ |

Integrated Reasoning Data Structure

Section Data

| Field | Size | Allowed Values | Notes |
|---|---|---|---|
| Integrated Reasoning (IR) Section Data | | | |
| IR Pool ID | Text(30) | | Object Bank Identifier |
| IR Script ID and/or FormCode | Text(8) | | The section ident value for the script randomly selected. |
| IR Test Time Remaining | Integer(8) | | milliseconds |
| IR Cumulative Item Time | Integer(8) | | Duration the candidate spent on all items in the IR section. In milliseconds |
| IR Instructions Latency | Integer(8) | | Duration the candidate spent on the IR tutorial. Milliseconds |
| # IR Items Selected | Integer(2) | | Count number of IR items selected for presentation to candidate. Also the counter for the number of IR item data blocks included in record. |
| # IR Items Answered | Integer(2) | | Number of items that contribute to section raw score and contain a response |
| IR Section Raw Score | Numeric(6,4) | 0 - n | Raw number right |
| IR Section Scaled Score | Integer(3) | | Scaled score -- empty for initial psychometric feed; valued for final score feed |

Figure 31

Item Data

| Field | Size | Allowed Values | Notes |
|---|---|---|---|
| IR Item Data - repeated for each IR item selected for delivery ||||
| IBN | Text(16) | example="10000066" | ACT Item Bank Number (Item Name) |
| Item Type | Integer(1) | example = 1 | Score Item type: 1=scored, 0=not. |
| Item Correctness Status | Integer(1) | example: 0-Incorrect 1-Correct Also include NULL or empty | Indicates if a candidate got an item correct. An item is considered correct if: 1. It contains a question (ie. Not a display) 2. Defines one or more item level correct conditions. 3. The candidate has met one or more of those correct conditions. |
| Item Completeness Status | Integer(1) | 0-Complete 1-Incomplete 2-Skipped 3-Not presented Also include empty and NULL | A status of the item. The definition of how an item is considered complete is configurable by exam. The default behavior is that all response opportunities on the item must be complete for the item to be considered complete. See your test publisher if you need to change this to one or more questions complete for the item to be considered complete. |
| Item Score | Numeric(6,4) | example = 1 | |
| Elapsed Time | Integer(8) | example=167324 | Time in milliseconds spent answering the item |
| # Response Opportunities Presented | Integer(2) | example=5 | Number of response opportunities presented with item – all are included here – includes material feedback (not required) response – used to control parsing of subsequent data |

Figure 32

Response Opportunity Data

| Field | Size | Allowed Values | Notes |
|---|---|---|---|
| IR Response Opportunity Data - repeated for each response opportunity within item | | | |
| Response Opportunity Name | Text | example="I0000066-R4" | Response name from authoring tool |
| Response Opportunity Response Value | Text | example = "C" | Candidate's answer to the response opportunity – typically assigned a multiple choice value "A", "B", "C", etc |
| Response Opportunity Status | Integer(1) | 0 - Complete<br>1 - Incomplete<br>2 - Skipped<br>3 - Not Presented<br>Allow empty and NULL | A status for the response |
| Response Opportunity Score | Numeric(6,4) | example = 1 | This field is the value of the variable associated with the response or an empty string if no variable is associated with the response. |
| Response Opportunity Scored | Integer(1) | example:<br>0-Un-scored<br>1-Scored<br>Allow empty and NULL | |
| Response Opportunity Correct<br>...for each Response Opportunity within the item | Integer (1) | | There will be N sets of these fields, where N = # IR items presented -- items occur here in the order they were presented |
| ... For each IR Item presented (end of Item Data) | | | There will be R sets of these fields, where R = # response opportunities defined for the item |

Figure 33

COMPUTER-IMPLEMENTED METHOD OF ADMINISTERING AND SCORING INTEGRATED REASONING QUESTION FORMATS

CROSS-REFERENCE TO RELATED APPLICATIONS

This application claims priority to U.S. Provisional Patent Application No. 61/766,428 filed Feb. 19, 2013, which is incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

A standardized test is a test that is administered and scored in a consistent, or "standard," manner. As discussed in U.S. Pat. No. 6,234,806 (Trenholm et al.), which is incorporated by reference herein, standardized tests are administered to examinees (also, referred to herein as "test-takers, respondents, or users") for educational testing and evaluating particular skills. Academic skills tests include SATs, LSATs and GMATs.

The educational needs of modern society continue to evolve, and thus the desired academic skills that employers require likewise change. Academic skill tests thus must continue to evolve to properly gauge an examinee's abilities with respect to new skills. To meet this need, extensive research is conducted to identify the new skills that need to be tested for, and to create standardized test questions which can accurately measure the examinees' proficiency with respect to the new skills. Professionals, such as psychometricians who work in the educational measurement field, translate these identified skills into new test question formats and actual test questions. There are many feedback loops in the test development process. For example, even after suitable test question formats are identified and actual test questions are generated, it is still necessary to conduct extensive field tests over large populations of examinees to evaluate whether test responses are accurately measuring the examinees' proficiency with respect to the identified skills. Psychometricians use a plurality of well-known metrics to measure whether test responses from a pool of examinees meet this standard. Some of the metrics include item analysis, response latency analysis, form analysis, equating analysis and differential item functioning (DIF) analysis.

One important aspect in developing test formats is the scoring process. There are many ways to score a test. The manner in which test responses are presented and scored can greatly influence whether the test accurately measures the skills of the examinee that the test-giver wishes to gauge. Some scoring factors include whether full or partial credit is used and the score scale. For example, if a test provides multiple response opportunities for an item, the same exact test might be an inaccurate gauge of a skill to be measured if the scoring factors are not properly selected. Again, extensive analysis by psychometricians of field test results must be performed to confirm that a proposed scoring process should be adopted.

Furthermore, the field tests should be performed on a general population of examinees who are taking standardized tests in the ordinary course of their educational advancement, such as when applying to higher education programs. Performing tests in laboratory settings does not provide a sufficient environment to ensure that the test results will accurately reflect examinees' performance on a real-world version of the test.

SUMMARY OF THE INVENTION

Preferred embodiments of the present invention relate to automated methods and systems for presenting and scoring items which are presented in different question formats that include (i) graphics interpretation, (ii) two-part analysis, (iii) table analysis, and (iv) multi-source reasoning. There are a plurality of response opportunities for each item, and each response opportunity is independent of each other. The methods and systems operate as follows for each of the different question formats:

1. An item is presented in the respective question format on a processor-controlled user interface display screen.
2. A response engine receives the response for each response opportunity that is presented on the user interface display screen.
3. A scoring engine in communication with the response engine receives the plurality of responses and scores the plurality of responses by determining whether the response selected for each response opportunity is correct, and assigning credit for the item only if each of the responses for each of the response opportunities is correct, and assigning no credit for the item if at least one of the responses for each of the response opportunities is incorrect.

As noted above, each response opportunity is independent of each other. "Independent of each other" means that the test-taker can respond to each of the response opportunities without needing to know the responses (or the correct response) to any of the other response opportunities. Stated another way, the test-taker won't have to answer one question (response opportunity) correctly to be able to answer another (response opportunity).

BRIEF DESCRIPTION OF DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIGS. 3-28 shows a sample session for presenting questions to a user in accordance with one preferred embodiment of the present invention.

FIGS. 31-33 show the Integrated Reasoning section data structure at the data value level in accordance with one preferred embodiment of the present invention.

DETAILED DESCRIPTION OF THE INVENTION

Certain terminology is used herein for convenience only and is not to be taken as a limitation on the present invention.

The question formats of the present invention are described in the context of the Integrated Reasoning (IR) section of the Graduate Management Admissions Test (GMAT®), administered by the Graduate Management Admissions Council, located in Reston, Va. The IR section was formally added to the GMAT exam in June 2012 so that the score on the IR section officially counts as a portion of the GMAT score since that date. However, the question formats of the present invention are not limited to the particular use in the GMAT exam and may be used on many other types of standardized tests.

Figure 1:
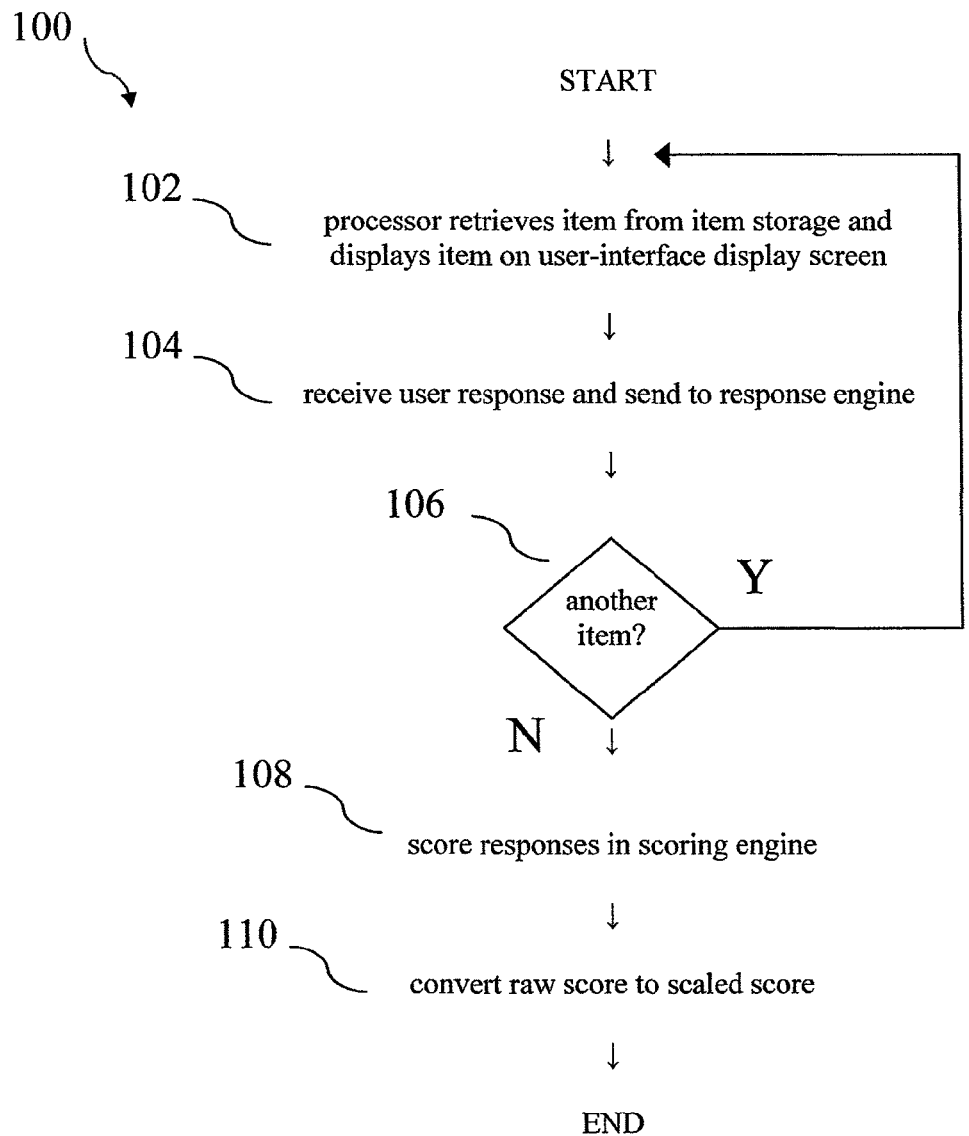
FIG. 1 shows a system flowchart accordance with one preferred embodiment of the present invention.
Figure 2:
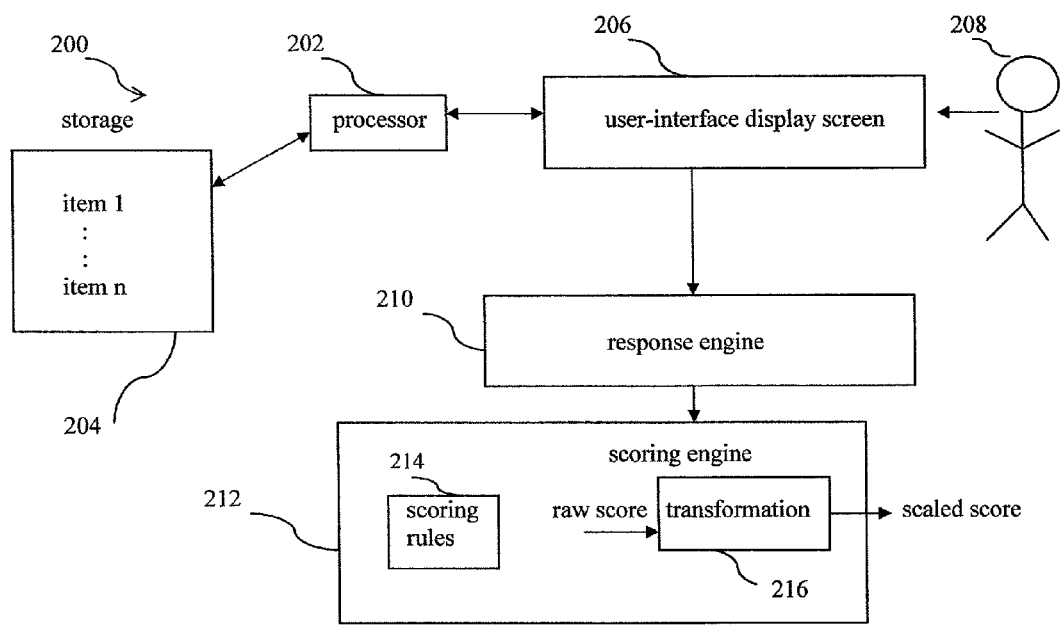
FIG. 2 shows system hardware/software architecture in accordance with one preferred embodiment of the present invention.

Each of the items in the various question formats are presented to the user and scored via the same combination of hardware and software, shown in FIGS. 1 and 2. FIG. 1 shows a system flowchart 100 and FIG. 2 shows system hardware/software architecture 200. Referring to FIGS. 1 and 2, a processor 202 retrieves an item from storage 204 and displays the item on user-interface display screen 206 (step 100). A user response is received from user (test-taker) 208 and the response is sent to a response engine 210 (step 104). There will be multiple response opportunities for each item, and thus there will be multiple responses for each item. If there are more items to be presented to the user 208, then the next item is retrieved from the storage 204 and is presented to the user ("YES" output of decision block 106, step 102). If there are no more items to be presented to the user 208, then the responses are ready to be scored ("NO" output of decision block 106). A scoring engine 210 receives the responses from the response engine and scores the responses using scoring rules 214 (step 108). A scoring transformation 216 converts the score from a raw score to a scaled score (step 110).

In one preferred embodiment, the response engine 210 and the scoring engine 212 each have their own processor (not shown) which is separate from the processor 202 which controls the presentation of items on the user-interface display screen. However, other embodiments, one or more of the processors may be shared, such as the processor 202 and the processor associated with the response engine 210.

The IR section is only one of a plurality of sections of the GMAT exam. Since exam scoring preferably occurs separately from the test-taking site, and a later point in time, the responses for the IR section and the other sections of the GMAT exam will typically be stored in a file (not shown) populated at the exam site or at a remote site in communication with the exam site. This file is then electronically communicated to the scoring engine 212 at a later point in time. In one embodiment, a user may be provided at the exam site with some form of a score derived from their responses. In this embodiment, a version of the scoring engine 210 may operate locally to provide instant feedback to the test-taker after completion of the GMAT exam. However, no official score is provided at the exam site, and the score may be in the form of a raw score, not a scaled score.

Exam scoring may also be performed by a different entity that the entity that administers the GMAT exam. For example, an independent GMAT-certified contractor may administer the GMAT exam, but the scoring may be performed by a different GMAT-certified contractor, or by GMAT directly. Accordingly, there will typically be a time-delay between exam taking and exam scoring, and there will also typically be a data file transfer of the stored responses between different entities who are responsible for exam administration and exam scoring.

Referring again to the scoring engine 212, the scoring rules operate as follows:

1. Determine whether the response selected for each response opportunity is correct.

2. Assign credit for the item only if each of the responses for each of the response opportunities is correct, and assign no credit for the item if at least one of the responses for each of the response opportunities is incorrect.

In this manner, no partial credit is given for an item. As discussed above, each response opportunity is independent of each other. In conventional exam scoring where there are multiple response opportunities for a given item, and wherein the response opportunities are independent from each other, each response opportunity is assigned credit or no credit, depending upon whether the response is correct or incorrect. Thus, in conventional exam scoring for items described herein, partial credit is given for an item.

There are known (prior art) types of multiple choice exams wherein multiple potential correct answers are permitted for a question related to an item (e.g., there may be five answers, and the test-taker is instructed to select all correct answers). Some of these exams are graded in a manner that does not provide partial credit, so that the test-taker must select all of the correct answers when given a response opportunity, and none of the incorrect answers when given the response opportunity, to receive credit. However, there is only one response opportunity for such a question (i.e., select all answers that apply triggers the response opportunity). If the test-taker correctly selects all of the answers on the next question for the item when given the response opportunity for the next question, then the test-taker gets credit for that question, regardless of how they scored on other questions related to the same item. The type of scoring used for these multiple choice/multiple potential correct answer tests is thus not the same type of scoring described in the present invention which assigns no partial credit when there are multiple response opportunities for an item and any one response for the item is incorrect. This is also referred to herein as scoring at the item level.

In one preferred embodiment of the present invention, there are four question formats, namely, graphics interpretation, two-part analysis, table analysis, and multi-source reasoning. A sample IR test section may have 12 items, generally evenly distributed among the four question formats (e.g., three items from each question format). An overview and detailed specifications for each of the four question formats is provided below.

Figure 3:
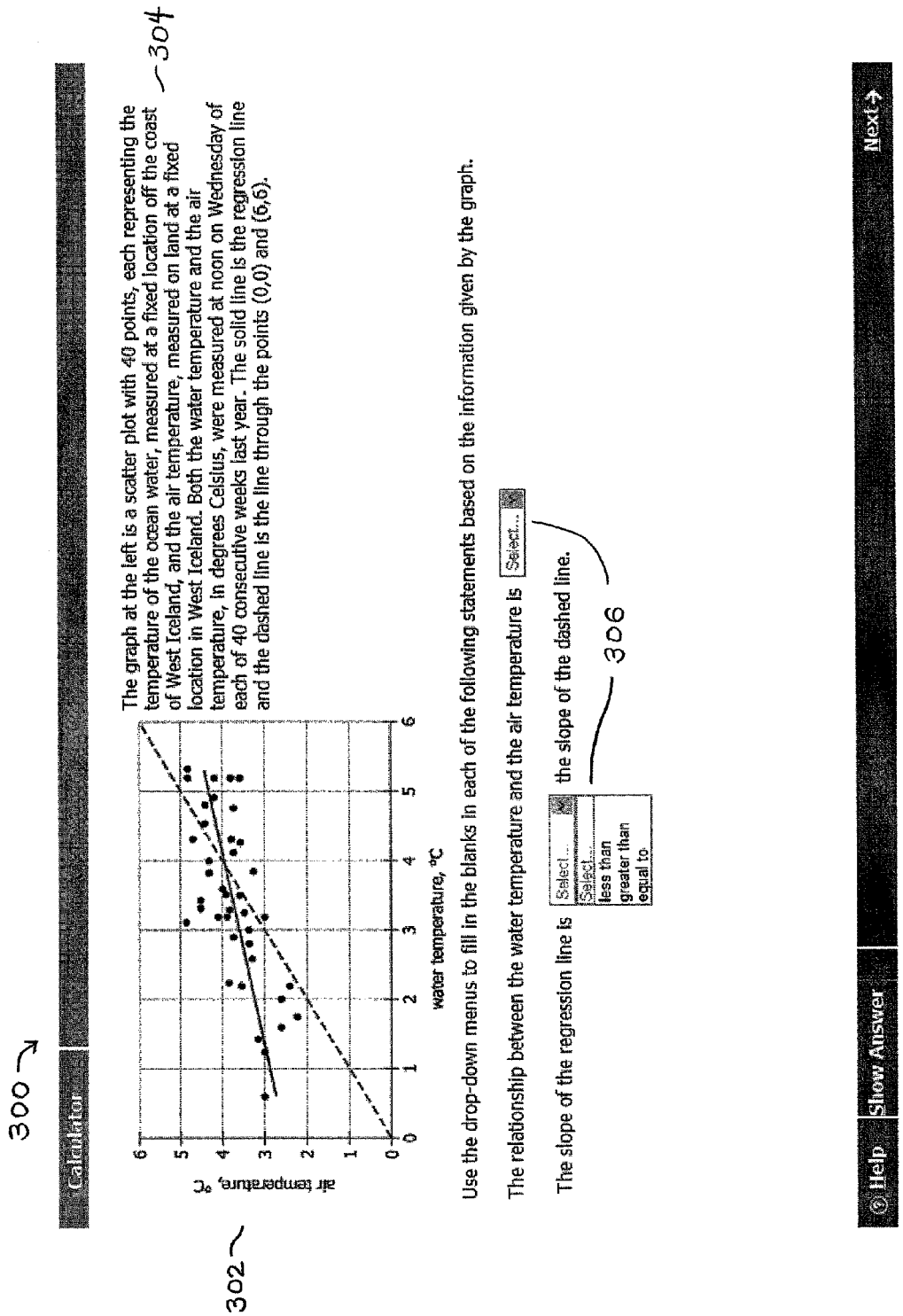

I. Graphics Interpretation Item Structure (FIG. 3—300)

A. Overview

There is a graphic representation of data or information 302, one or more statements which relate to the graphical representation 304; and a plurality of response opportunities in the form of pull-down menus 306 embedded within the one or more statements. Each of the pull-down menus present a plurality of responses to a response opportunity.

The response opportunity is a blank that is designed to complete the statement. A plurality of response opportunities may be embedded within one statement.

B. Detailed Specifications

Item Specifications i. Stimulus consisting of a graphic representation of data or information (no tables)

ii. Graph title and/or brief accompanying text and general task direction iii. One or more statements containing a total of two blanks (response opportunities) to be filled in using pull-down menus based on the stimulus iv. Response opportunities each having 2-6 options to choose from, one of which is the correct answer v. A total of 6-12 options across the two response opportunities

| Item Structure Abbreviation | Item Type (response method) | Stimulus | Number of Response Opportunities | Number of Options per Response Opportunity | Number of Keys per Response Opportunity |
|---|---|---|---|---|---|
| GRI | PM drop-down menu selection) | graphic or graphic with text | 2 | 2-6 | 1 |

Presentation Specifications i. Each of the two response opportunities is selected and presented on the same item screen during section administration.

ii. Candidates are required to respond to all response opportunities before moving to the next item.

II. Table Analysis Item Structure (FIG. 4—400)

A. Overview

There is a sortable table of data 402 and explanatory table information 404, a plurality of statements related to the sortable table of data and explanatory table information 406, and a dichotomous-choice response opportunity for each of statements 408. A sorting function is provided to allow for sorting of the table by column values.

B. Detailed Specifications

Item Specifications i. Sortable table consisting of at least 15 cells and limited to dimensions appropriate for single screen presentation ii. Table title and/or brief accompanying text iii. Three dichotomous-choice response opportunities based on the table iv. Examinees must indicate for each statement whether a condition is or is not met

| Item Structure Abbreviation | Item Type (response method) | Stimulus | Number of Response Opportunities | Number of Options per Response Opportunity | Number of Keys per Response Opportunity |
|---|---|---|---|---|---|
| TAN | MD (multiple dichotomous) | sortable table or sortable table with text | 3 | 2 | 1 |

Presentation Specifications i. Each of the three response opportunities is selected and presented on the same item screen during section administration.

ii. Candidates are required to respond to all response opportunities before moving to the next item presentation screen.

III. Two-Part Analysis Item Structure (FIG. 5—500)

A. Overview

There is stimulus text 502, a stem 504, and a multiple column response table 506 including a column of response options and a plurality of multiple choice columns. Each multiple choice column provides a respective response opportunity with a header related to the stem 504. The same column of response options are used for each of the multiple choice columns. The respondents select one choice for each of the multiple choice columns as their response.

B. Detailed Specifications

Item Specifications i. Stimulus text plus stem of approximately 150 words or less ii. No graphics or tables iii. Stem (question or task) based on the stimulus text iv. Response structure consisting of a 3-column table:

a. First two columns contain brief headings corresponding to the task posed in the stem b. The third column contains 5-6 options to consider c. Exactly one selection must be made in each of the first two columns d. Candidates can select the same answer for both columns

| Item Structure Abbreviation | Item Type (response method) | Stimulus | Number of Response Opportunities | Number of Options per Response Opportunity | Number of Keys per Response Opportunity |
|---|---|---|---|---|---|
| TPA | BV (vertical matching) | text | 2 | 5-6 | 1 |

Presentation Specifications i. Each of the two response opportunities is selected and presented on the same item screen during section administration.

ii. Candidates are required to respond to all response opportunities before moving to the next item.

IV. Multi-Source Reasoning Item Structure (FIGS. 6 and 7—600 and 700)

A. Overview

Figure 6:
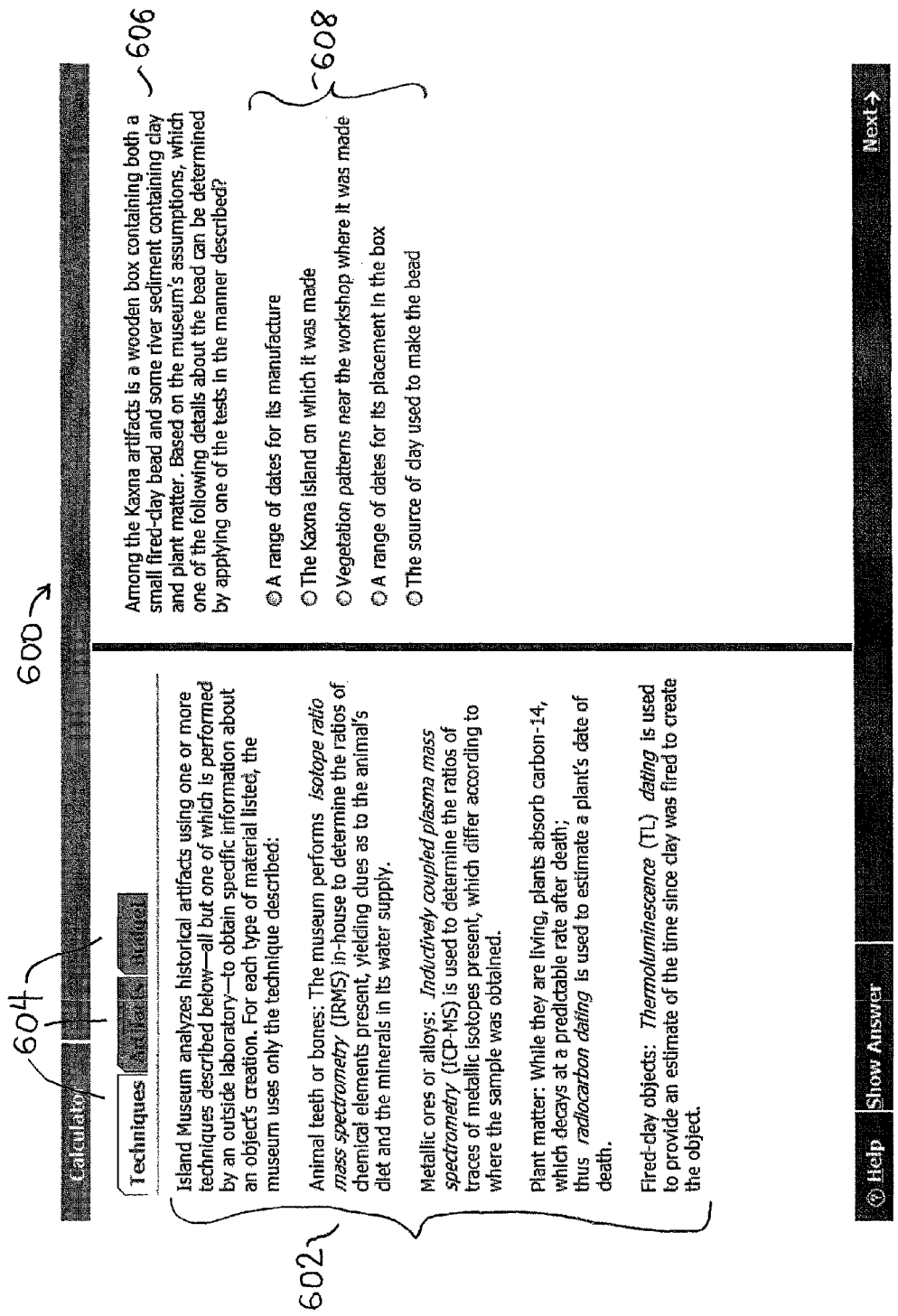

There is stimulus information 602, 702 presented in multiple tabs 604, 704, a plurality of statements 606, 706 related to the stimulus information 602, 702, and a plurality of response opportunities 608, 708, including a dichotomous-choice response opportunity 708 for some of the statements. The plurality of items in the item set use the same stimulus information. FIGS. 6 and 7 show only one response opportunity. The next item will provide the same stimulus information 602, 702 presented with the same multiple tabs 604, 704, but will provide another response opportunity of either of the types shown in FIGS. 6 and 7.

This item structure has items which have only a single correct key (see FIG. 6) and items which have multiple dichotomous response opportunities (see FIG. 7). The systems and methods of the present invention operate only on items in the item set that have a dichotomous-choice response opportunity. The format of the stimulus information 602 in FIG. 6 can be used for items which have either a single correct key as shown in FIG. 6 or a dichotomous response opportunity as shown in FIG. 7.

B. Detailed Specifications

Item Specifications i. Two or three stimuli on separate tabs.

a. Stimuli must be easily distinguishable from one another by presenting information in different modes (e.g., text, graphics, tables) or from different disciplines, sources, or viewpoints b. Two or three tabs consisting of text, graphics, or tables ii. Total word count for the stimulus tabs to be less than 300 iii. A set of 3 separate items based on the stimuli iv. 1 item is a 5-option multiple choice item (see first layout above)

v. 2 items are multiple-dichotomous choice items with 3 response opportunities each (see second layout above)

Examinees must indicate for each statement whether a condition is or is not met vi. At least 2 items in a set require the use of more than one tab to answer correctly

| Item Structure Abbreviation | Item Type (response method) | Stimulus | Number of Response Opportunities | Number of Options per Response Opportunity | Number of Keys per Response Opportunity |
|---|---|---|---|---|---|
| MSR | MD (multiple dichotomous) | 2-3 tabs | 3 | 2 | 1 |
| MSR | A (single correct key) | 2-3 tabs | 1 | 5 | 1 |

Presentation Specifications i. The 3 items assigned to the set are predetermined during authoring.

ii. The presentation sequence of the items assigned to the set is fixed during administration.

iii. Each of the 3 response opportunities for the multiple-dichotomous items is selected and presented on the same screen during section administration.

iv. Candidates are required to respond to all response opportunities before moving to the next item.

An example of an Integrated Reasoning section of the GMAT exam which consists of 12 questions is provided below. Successive display screens are shown to illustrate the screens that the test-taker experiences. In the example below, responses are entered for each of the response opportunities. Some of the responses are correct and some are incorrect. An example of the scoring process using the responses given in the example The test-taker is provided with the following instructions for this section:

The Integrated Reasoning section consists of four question types, which require you to analyze and synthesize data in different formats and from multiple sources.

i. Almost all question formats require multiple responses. Questions are designed to measure how well you integrate data to solve complex problems, so you must answer all parts of a single question correctly to receive credit.

ii. All answer choices for a single question are presented on the same screen. You must submit responses to all parts of the question before moving on to a new question on another screen. Once you answer a question, you may not go back and change the answer.

iii. Data presented in text are approximately 300 words or fewer.

iv. Answer options don't provide information or clues that will help you solve other questions.

v. One set of data is used for several Multi-Source Reasoning questions, but the questions are independent of one another—you won't have to answer one question correctly to be able to answer another.

Graphics Interpretation: Interpret the graph or graphical image and select the option from a drop-down list to make the answer statements accurate.

Two-Part Analysis: Select one answer from each column to solve a problem with a two-part solution. Possible answers will be presented in a table with a column for each part.

Table Analysis: Sort the table to organize the data so you can determine whether certain conditions are met. Each question will have statements with opposing answers (e.g., yes/no, true/false, inferable/not inferable); select one answer for each statement.

Multi-Source Reasoning: Click on the page to reveal different data and discern which data you need to answer the question.

FIGS. 8-12 show a succession of display screens for graphics interpretation items.

Figure 8:
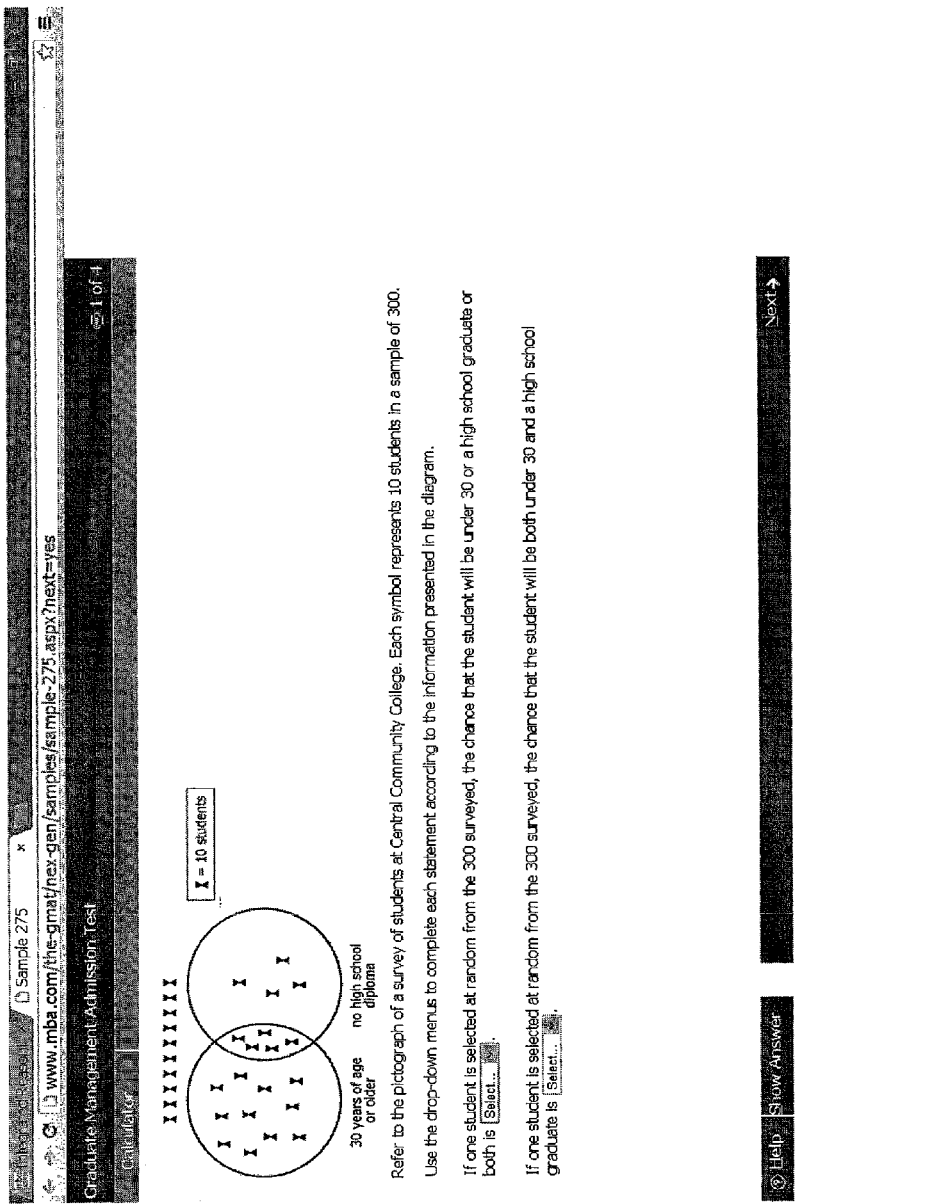

FIG. 8: This is the initial display screen for item 1 of 4.

Figure 9:
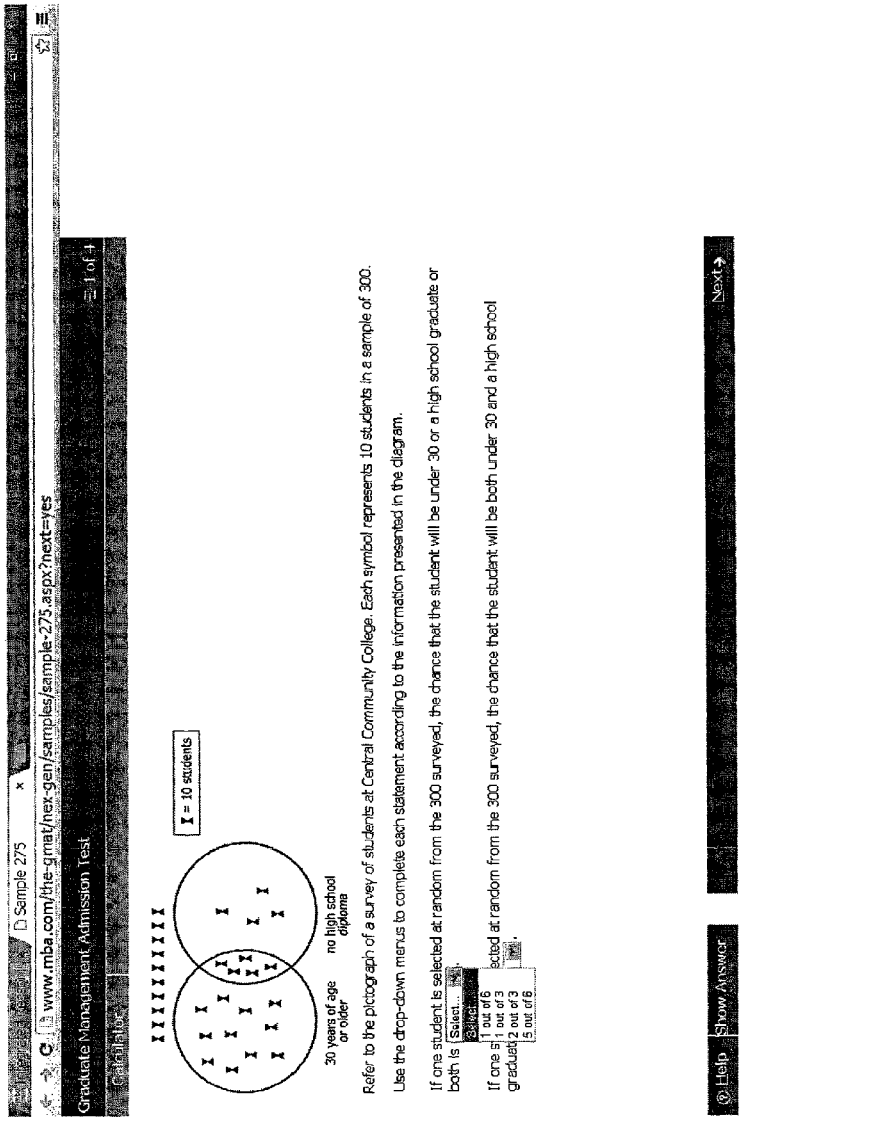

FIG. 9: The user selects the first drop-down box and views the potential responses to the first response opportunity.

Figure 10:
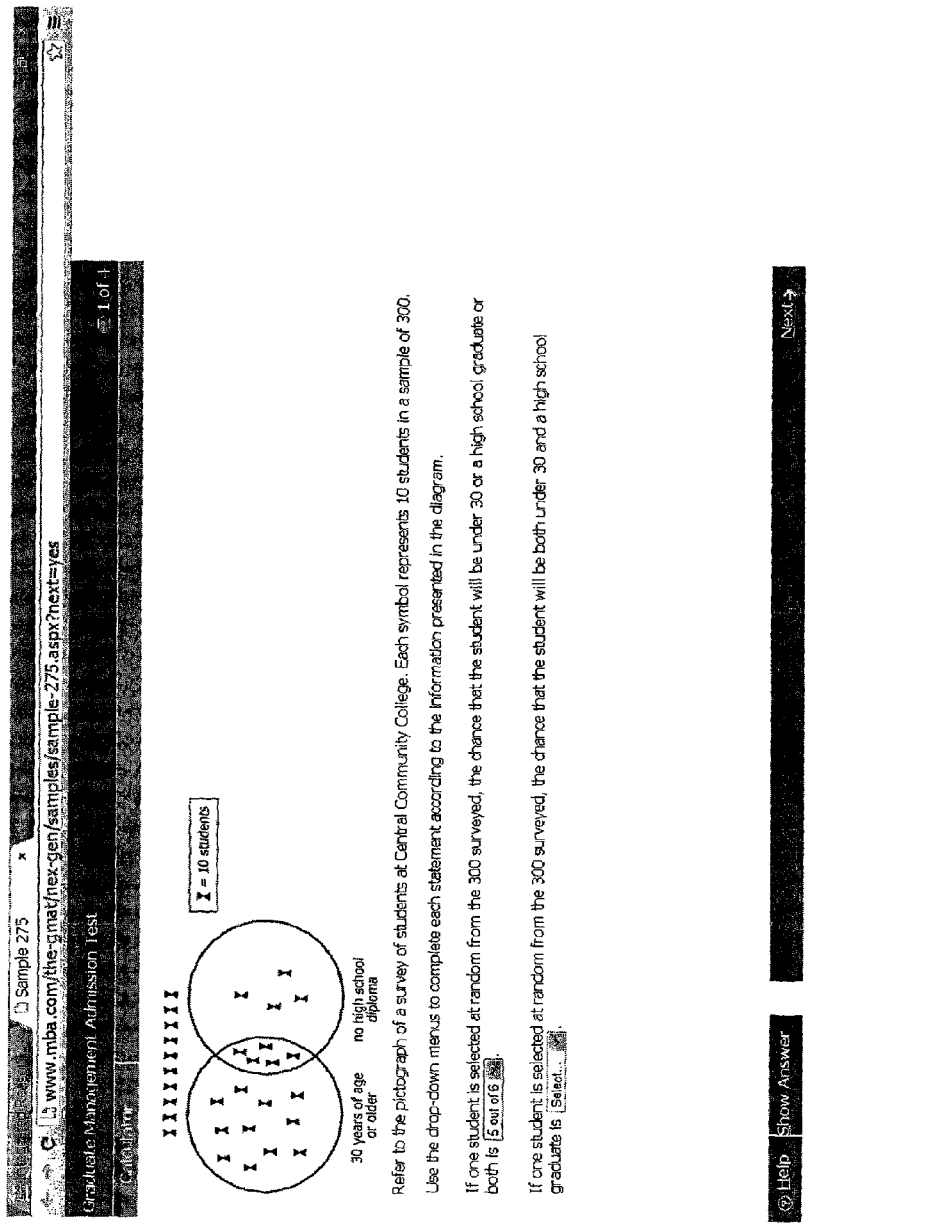

FIG. 10: The user selects the answer "5 of 6."

Figure 11:
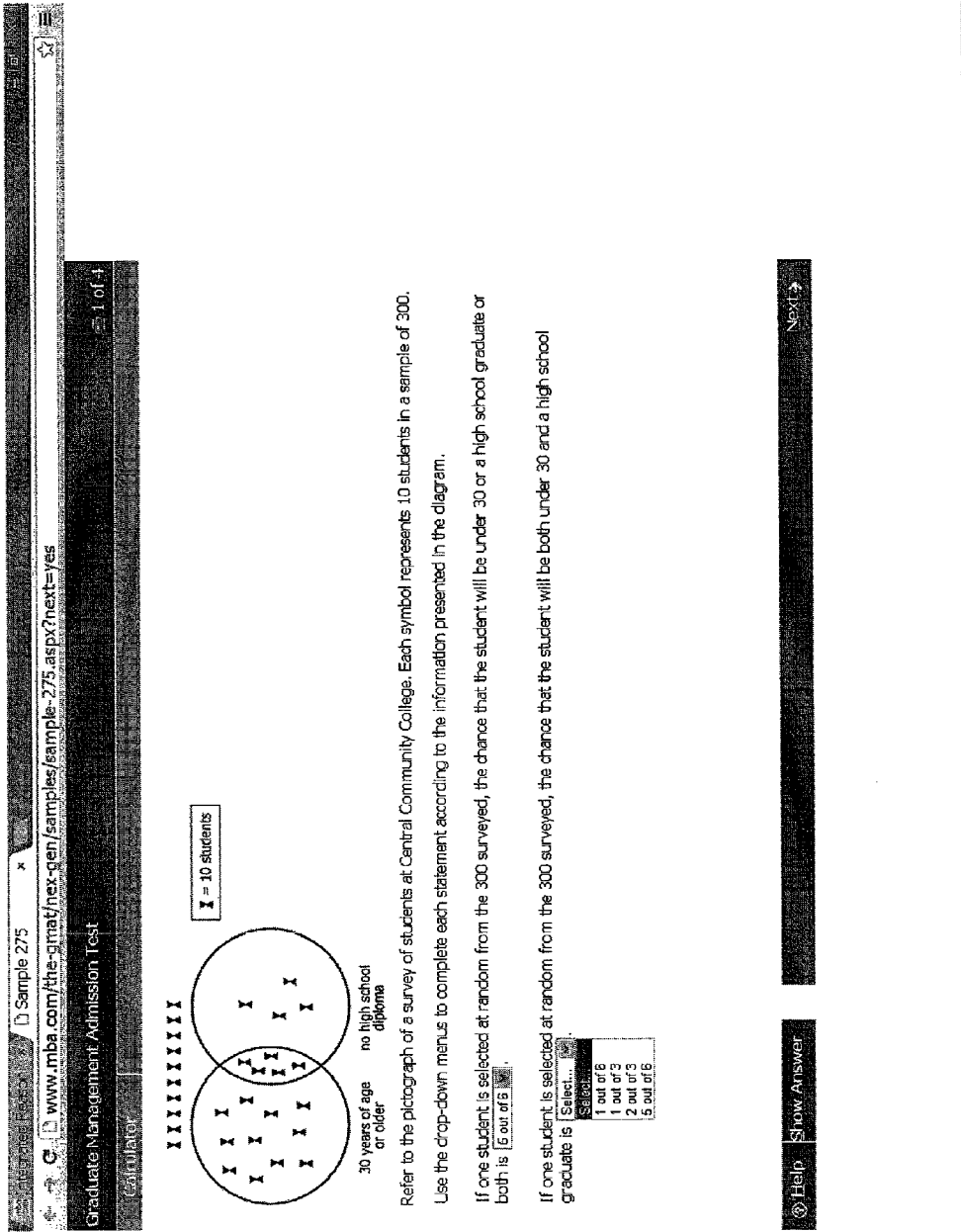

FIG. 11: The user selects the second drop-down box and views the potential responses to the second response opportunity.

Figure 12:
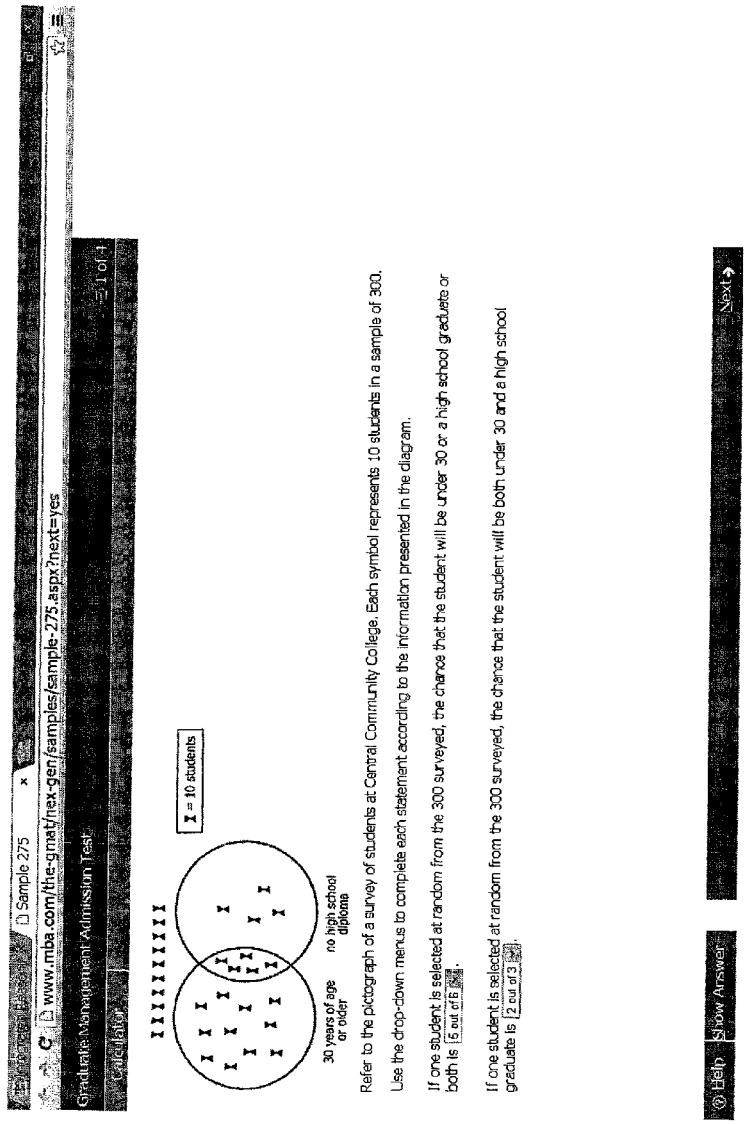

FIG. 12: The user selects the answer "2 out of 3" and hits the Next button to confirm the two responses.

The drop-down boxes can be selected and responded to in any order and the user may change the answer any point in time prior to hitting the Next button.

Figure 13:
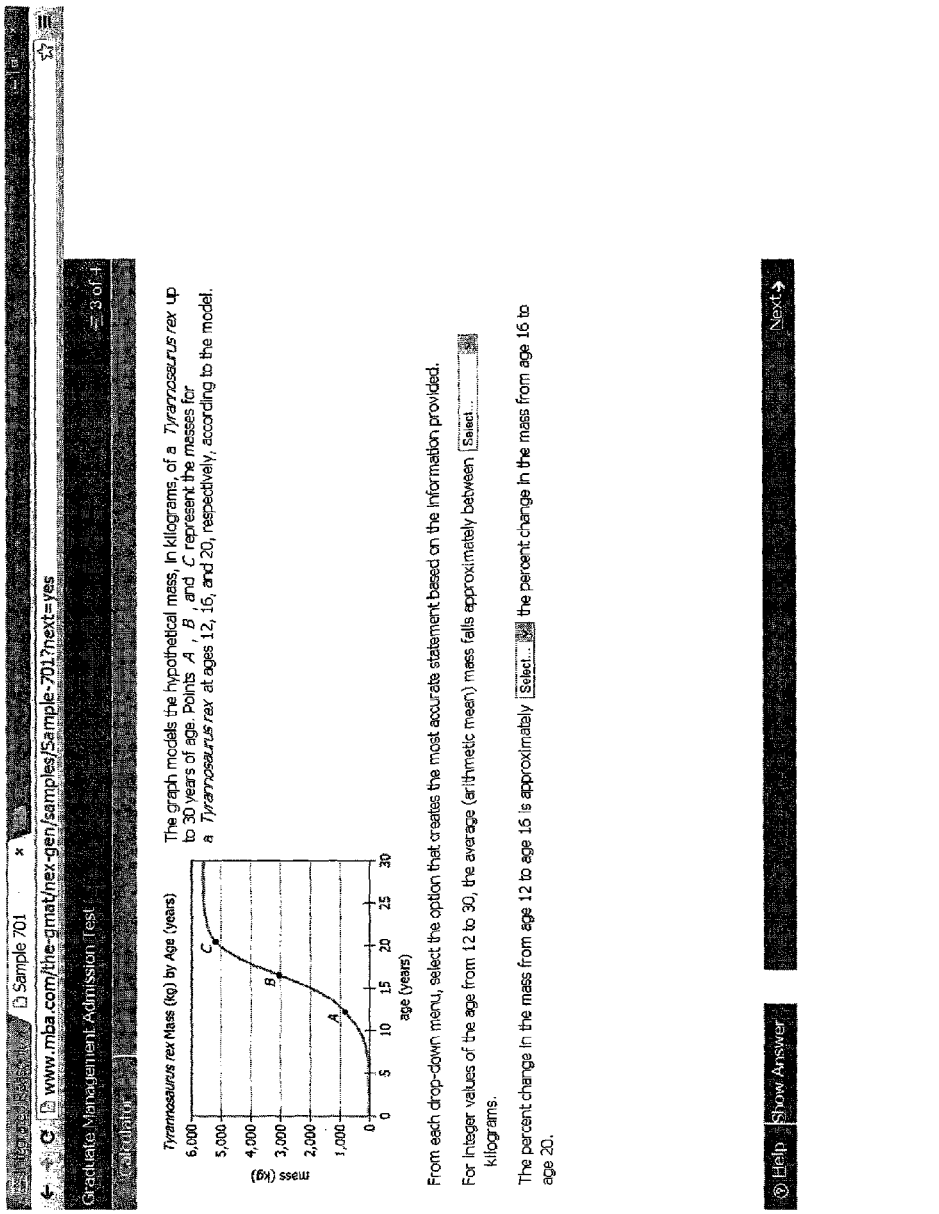
Figure 14:
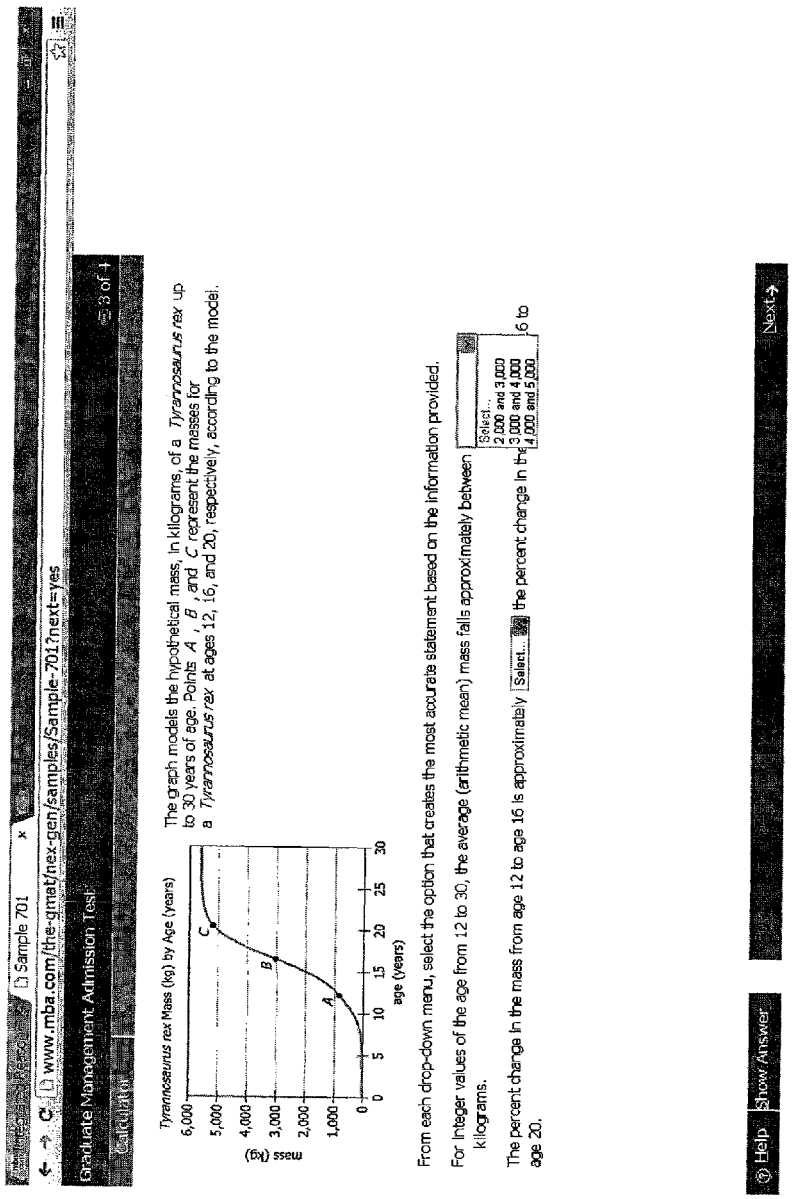

The process described in FIGS. 8-12 is repeated for the remaining graphics interpretation items. FIGS. 13 and 14 shows selected display screens for another graphics interpretation item.

FIG. 13: This is the initial display screen for item 3 of 4. (The display screens for Item 2 of 4 were skipped in this illustration.)

FIG. 14: The user selects the first drop-down box and views the potential responses to the first response opportunity.

Figure 15:
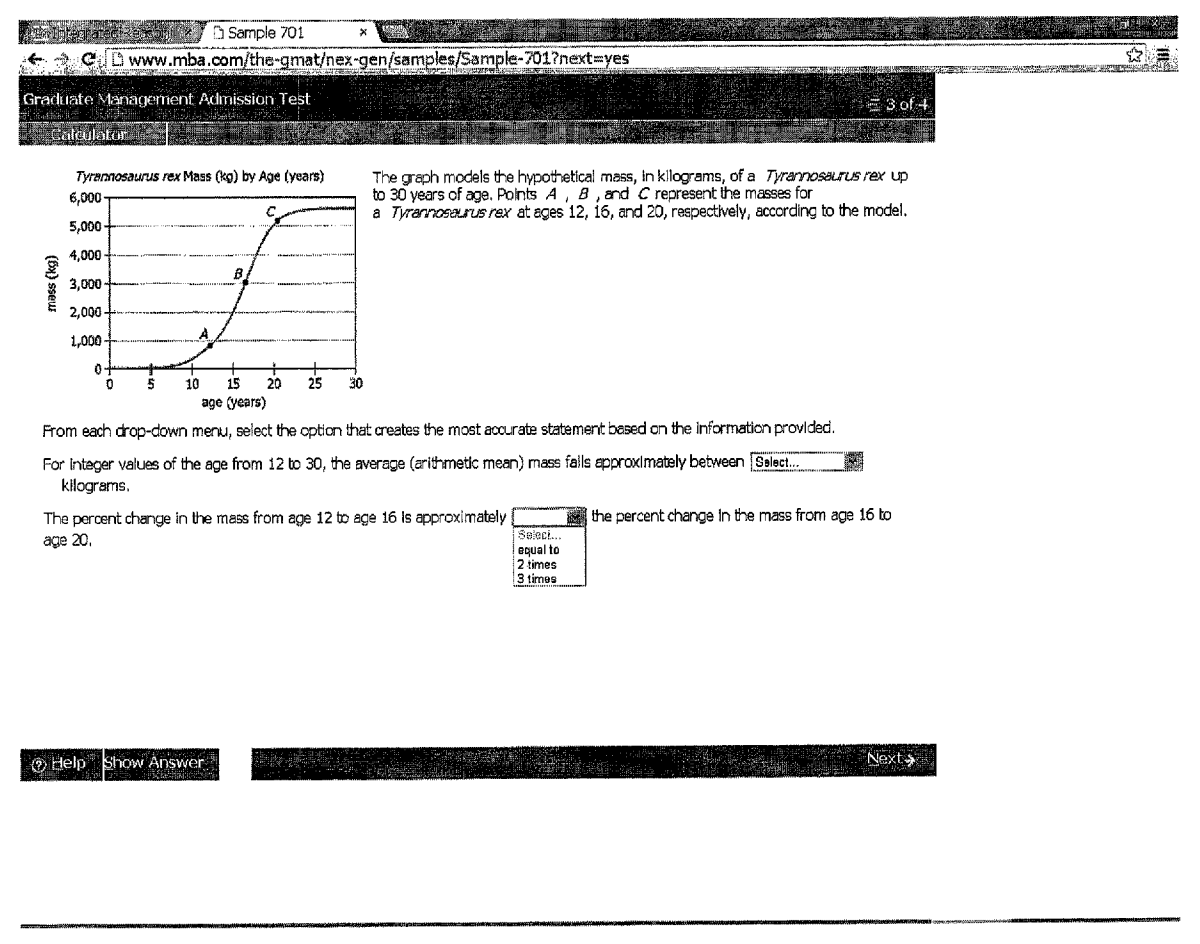

FIG. 15: The user selects the second drop-down box and views the potential responses to the second response opportunity.

Figure 17:
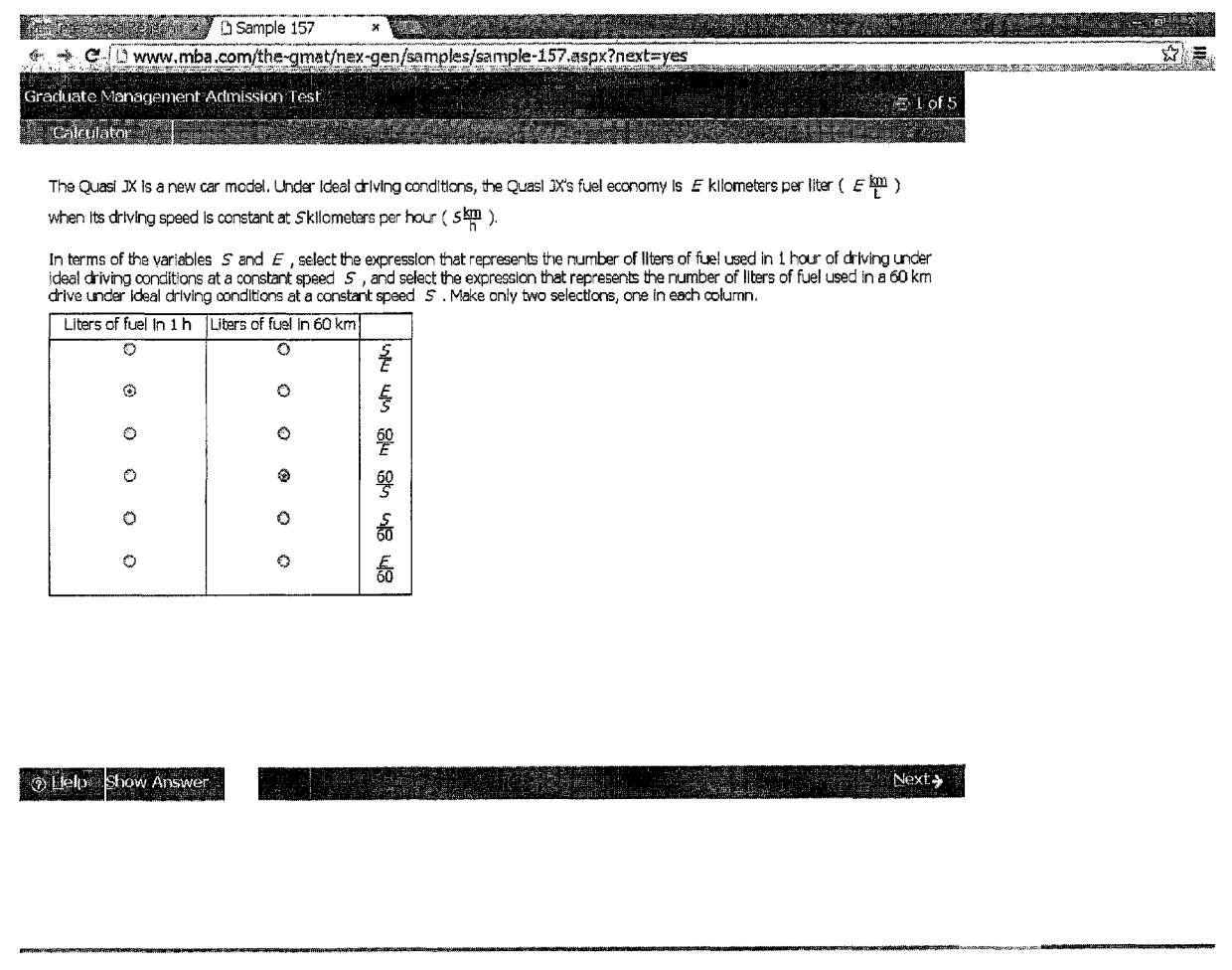

FIGS. 16-18 show a succession of display screens for two-part analysis items.

FIG. 16: This is the initial display screen for item 1 of 5. (There would not likely be five items of this type since there are only 12 total items.)

FIG. 17 shows the user's two responses made to the two response opportunities for item 1 of 5.

FIG. 18 shows the user's two responses made to the two response opportunities for item 4 of 5.

FIGS. 19-23 show a succession of display screens for table analysis items.

Figure 19:
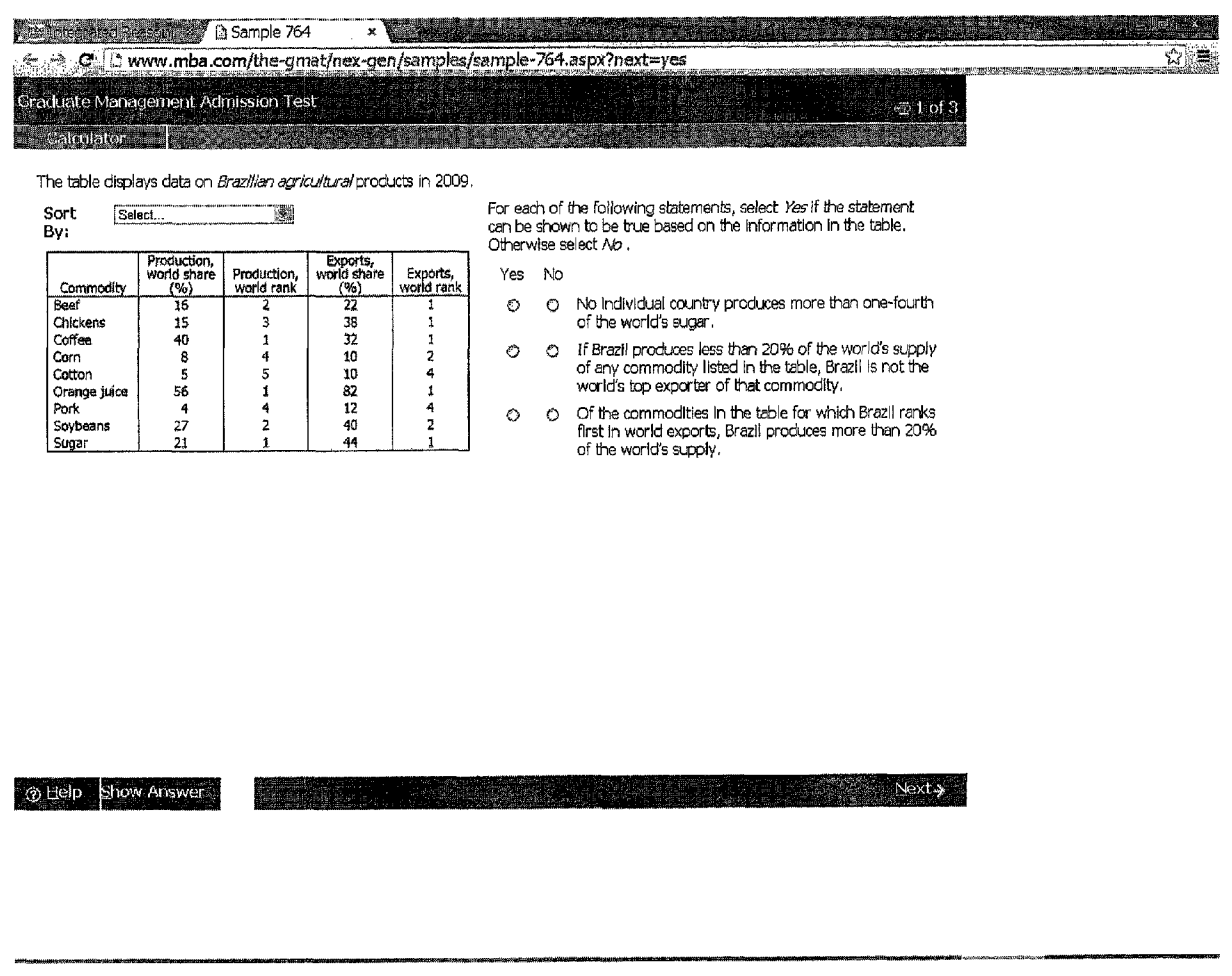

FIG. 19: This is the initial display screen for item 1 of 3.

Figure 20:
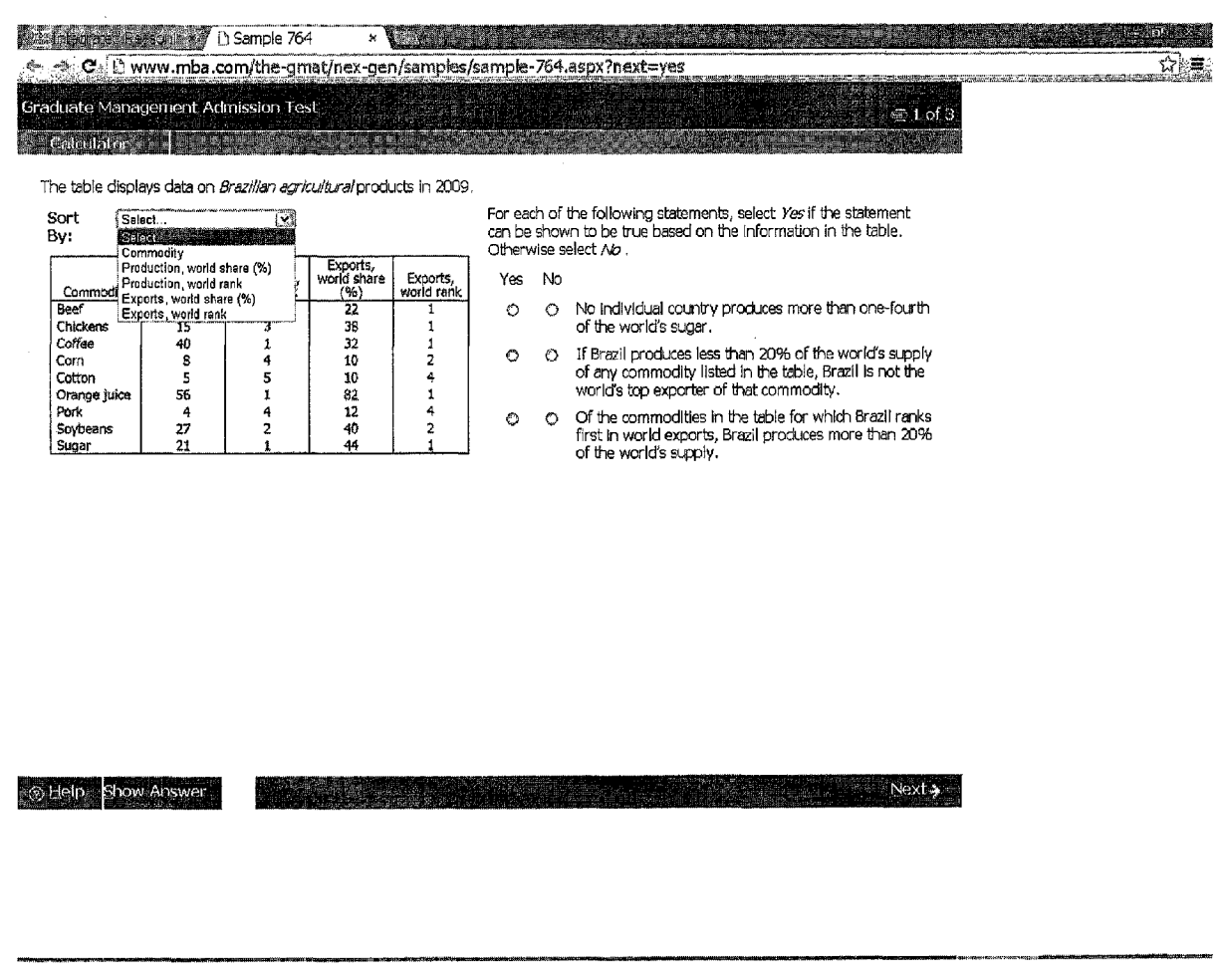

FIG. 20: The user selects the drop-down box for sorting of the table by column values.

Figure 21:
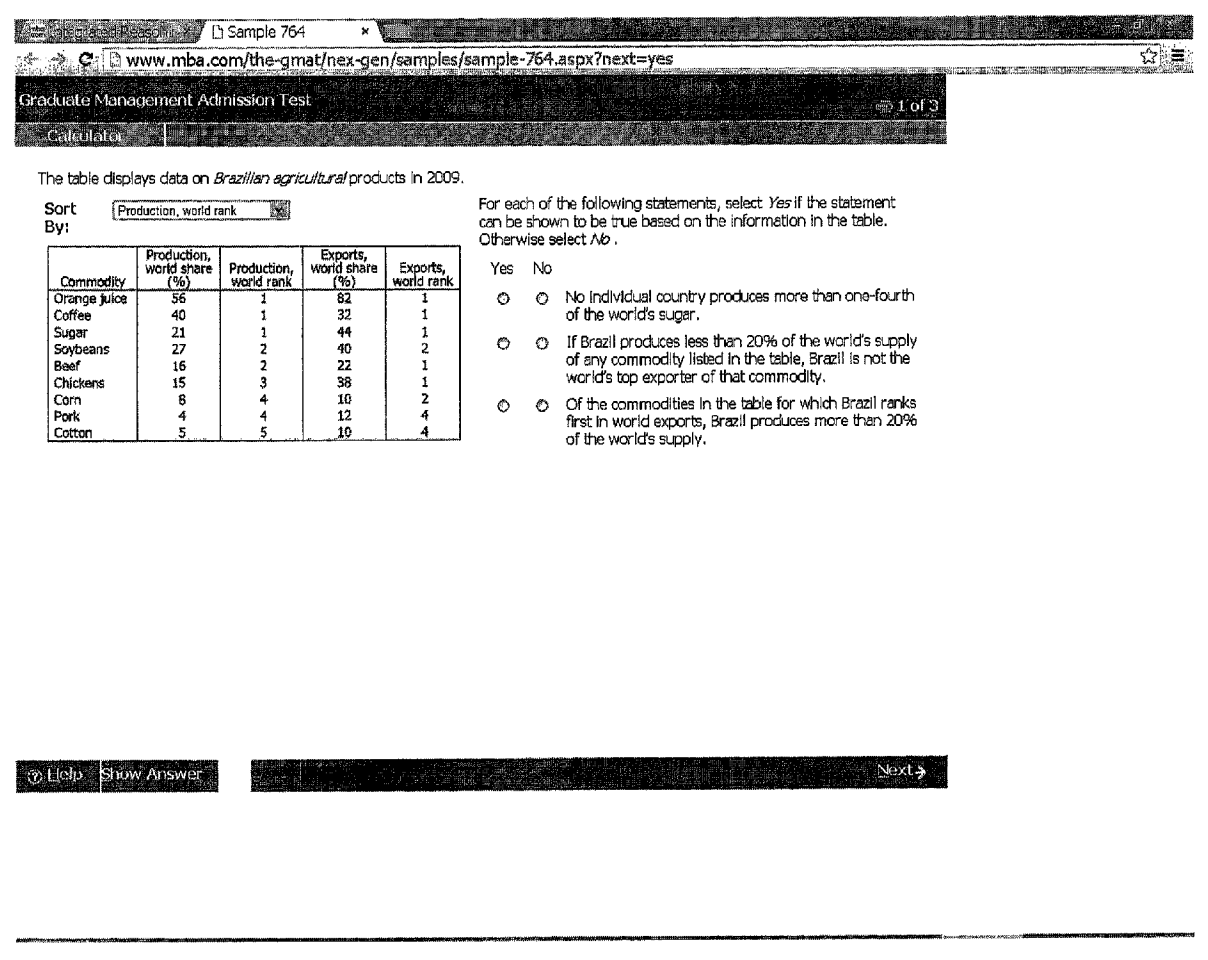

FIG. 21: The user has selected to sort by "Production, world rank." The table now appears differently than it did in the initial display screen of FIG. 19.

Figure 22:
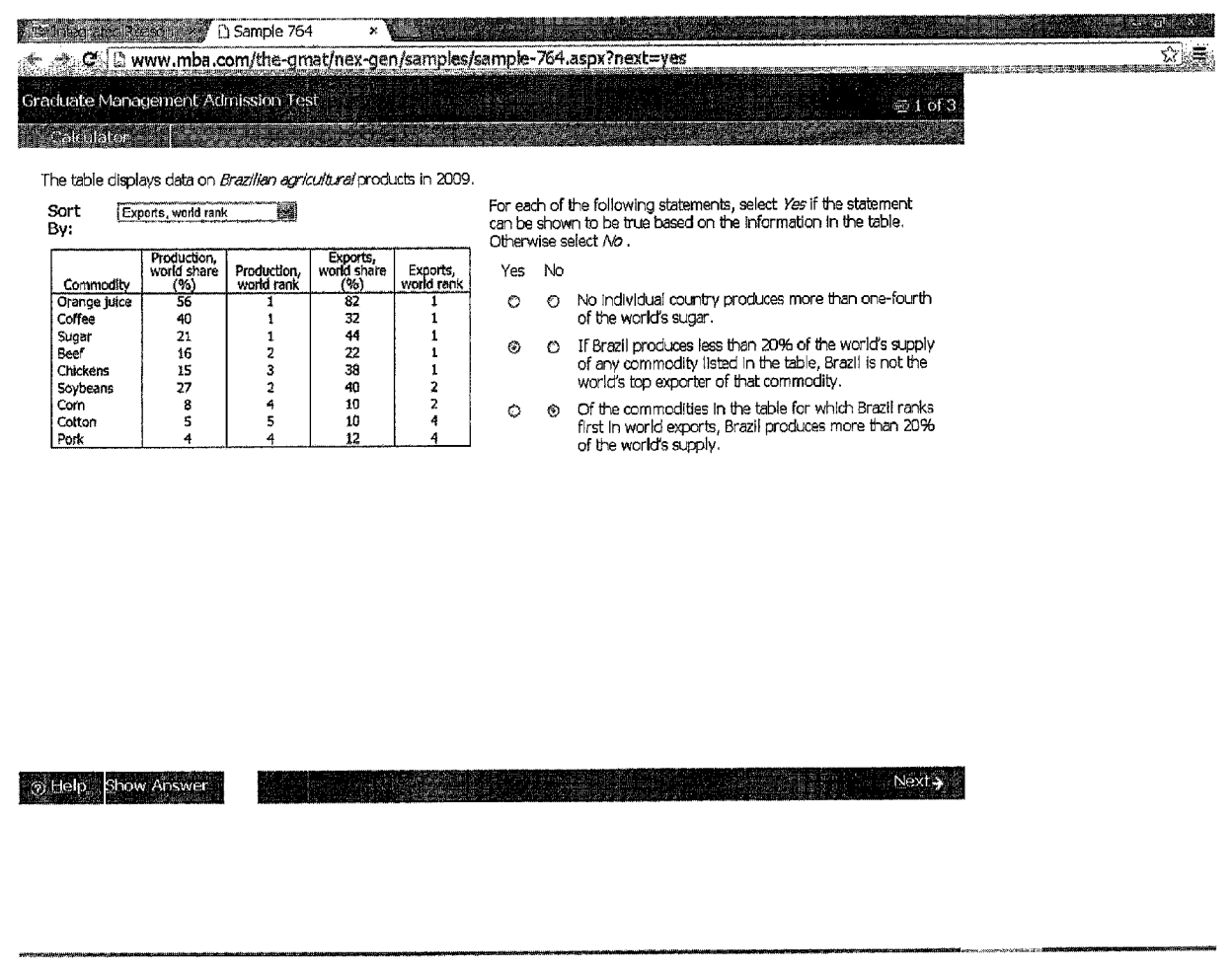

FIG. 22: The user has selected to sort by "Exports, world rank." The table now appears differently than it did in the initial display screen of FIG. 19 and the display screen of FIG. 21. The user has also made responses to the two response opportunities and is ready to select the Next button to confirm the responses. In a typical scenario, the user will repeatedly re-sort the table while deciding which responses to select for the two response opportunities. Any responses that were made remain selected even if the user performs additional table resorting. The responses can be changed at any time prior to selecting the Next button.

Figure 23:
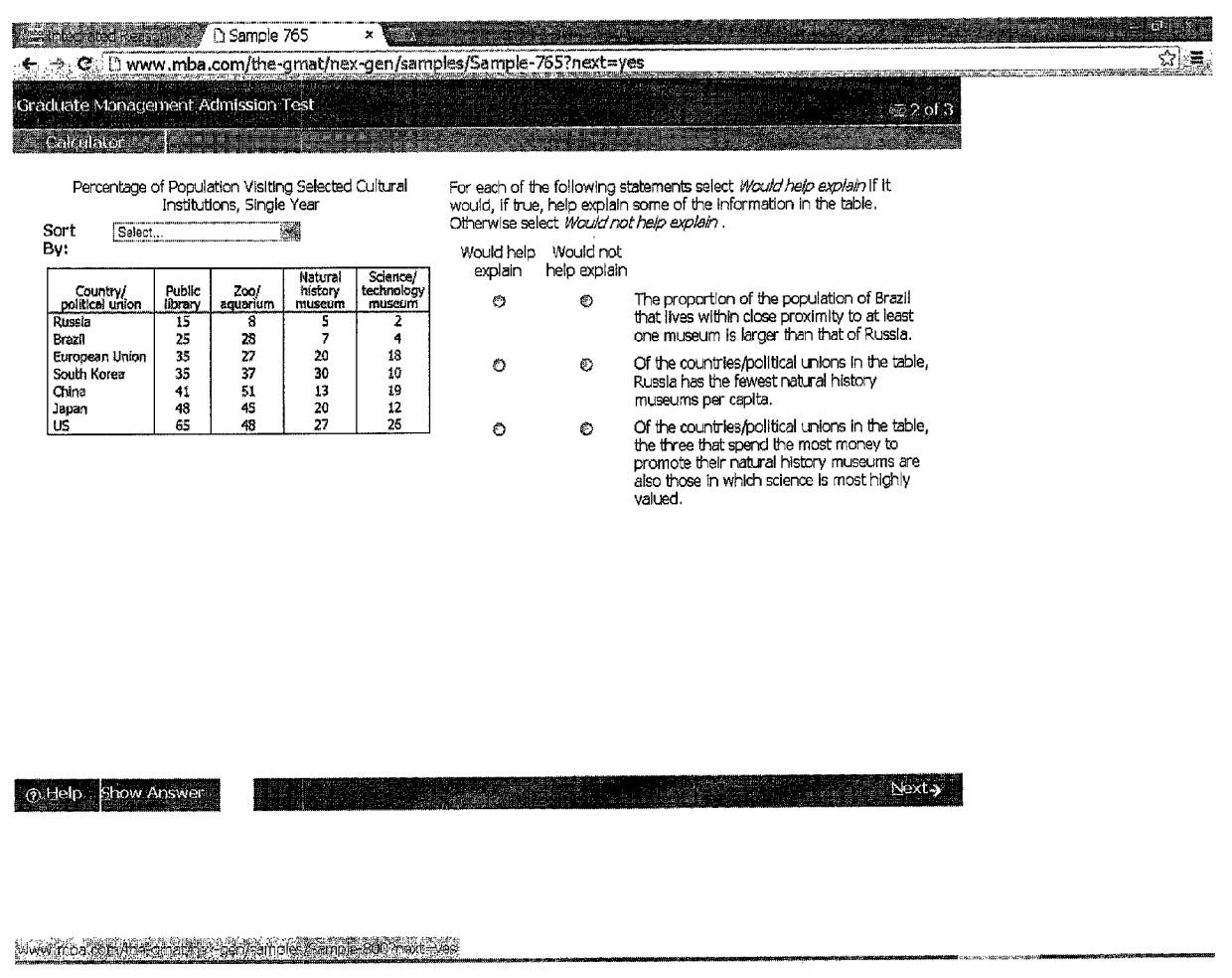

FIG. 23: This is the initial display screen for item 2 of 3.

FIGS. 24-27 show a succession of display screens for multi-source reasoning items.

Figure 24:
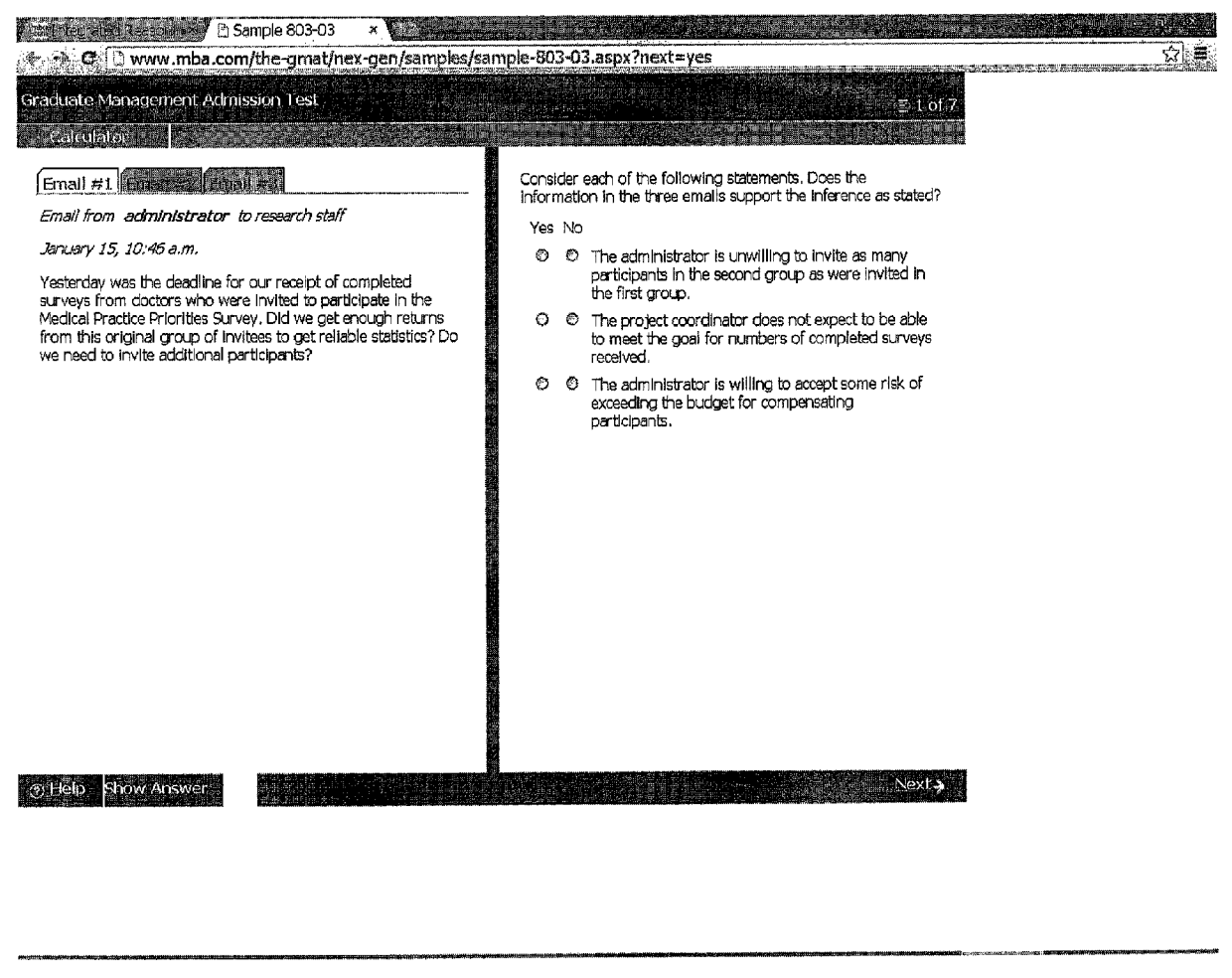

FIG. 24: This is the initial display screen for item 1 of 7. (Again, there would not likely be seven items of this type since there are only 12 total items.)

The stimulus information is Email #1.

Figure 25:
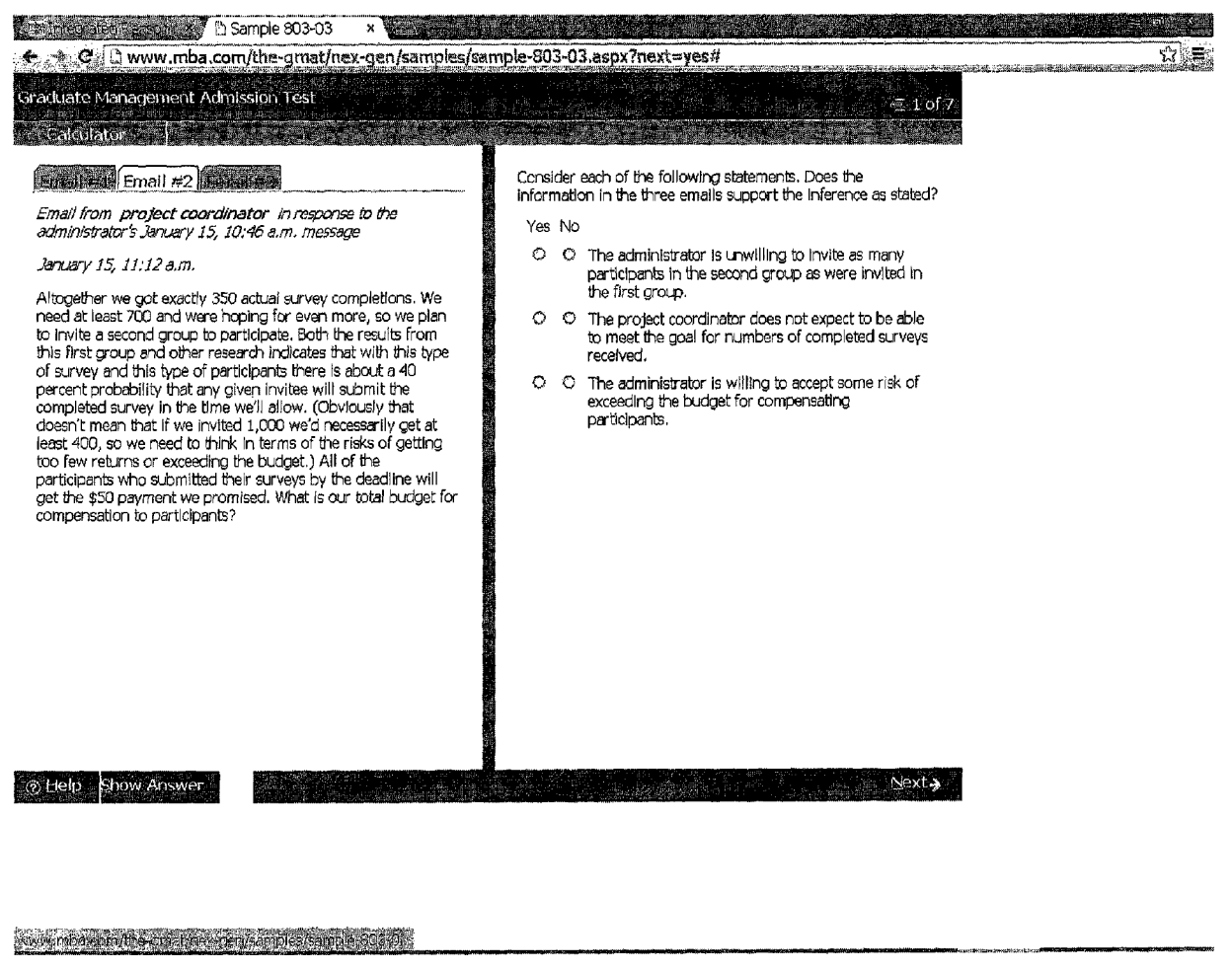

FIG. 25: The user clicks on Email #2 which changes the stimulus information to Email #2.

Figure 26:
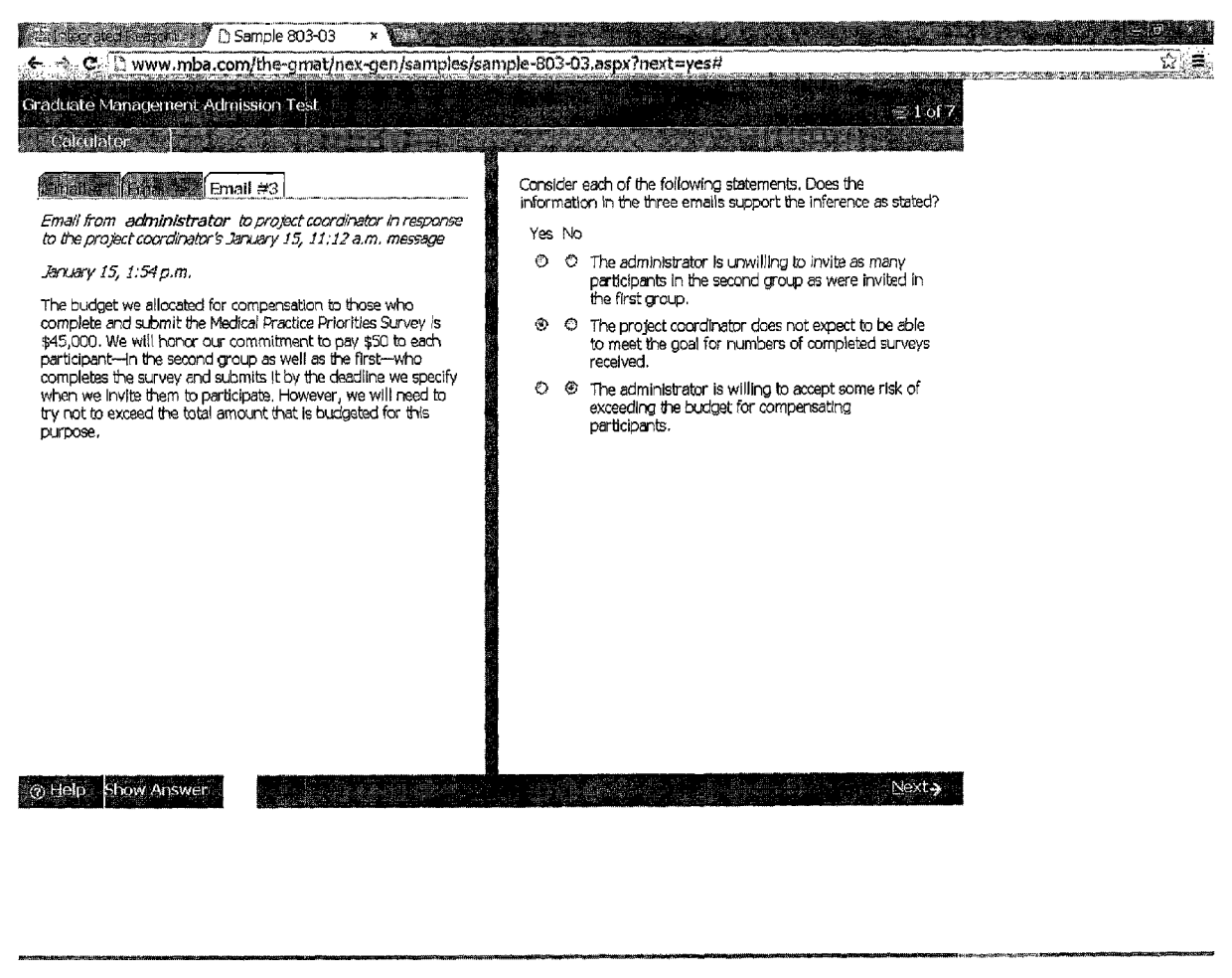

FIG. 26: The user clicks on Email #3 which changes the stimulus information to Email #3. The user has also made responses to the two response opportunities and is ready to select the Next button to confirm the responses. The user can also re-review the other emails before deciding on the responses. Any responses that were made remain selected even if the user goes back to review other emails. The responses can be changed at any time prior to selecting the Next button.

Figure 27:
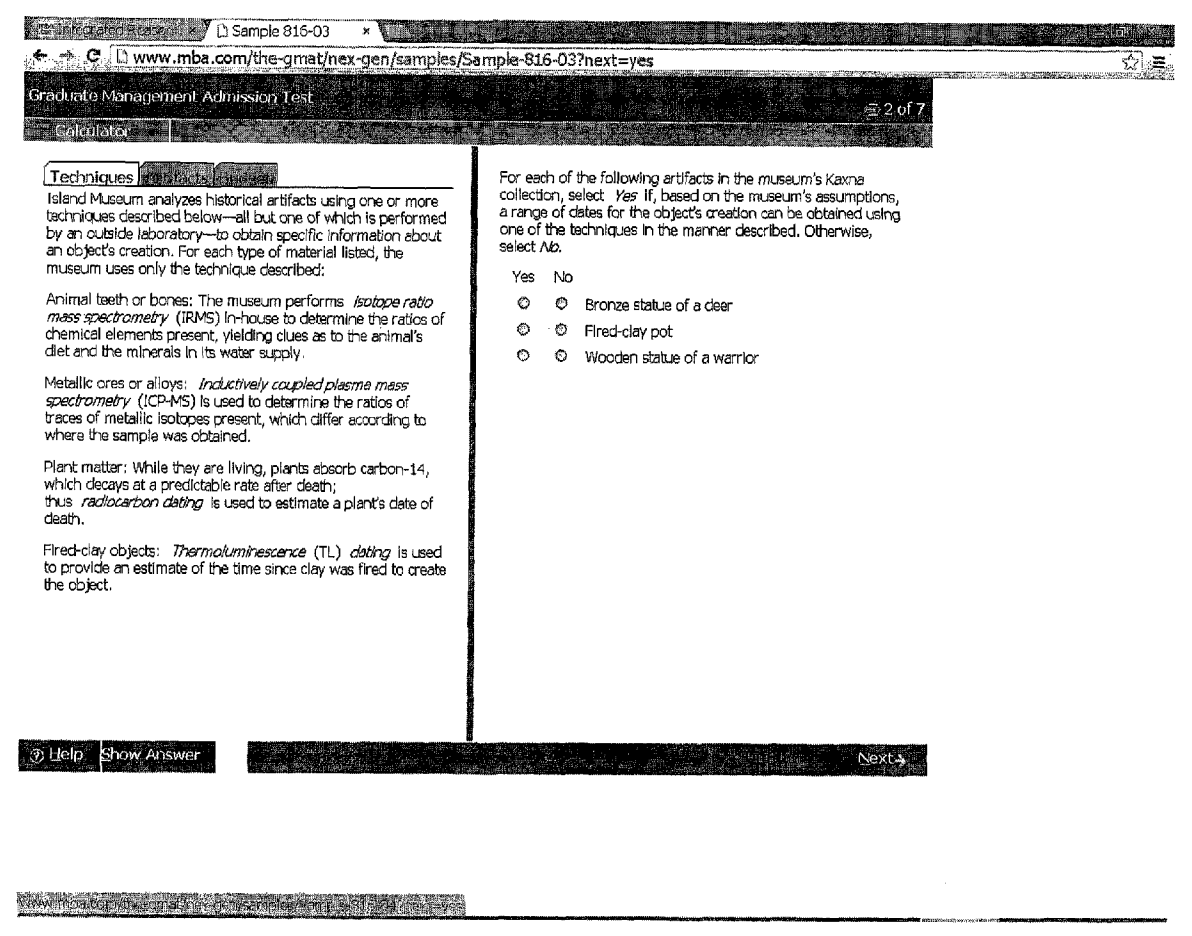

FIG. 27: This is the initial display screen for item 2 of 7.

Figure 28:
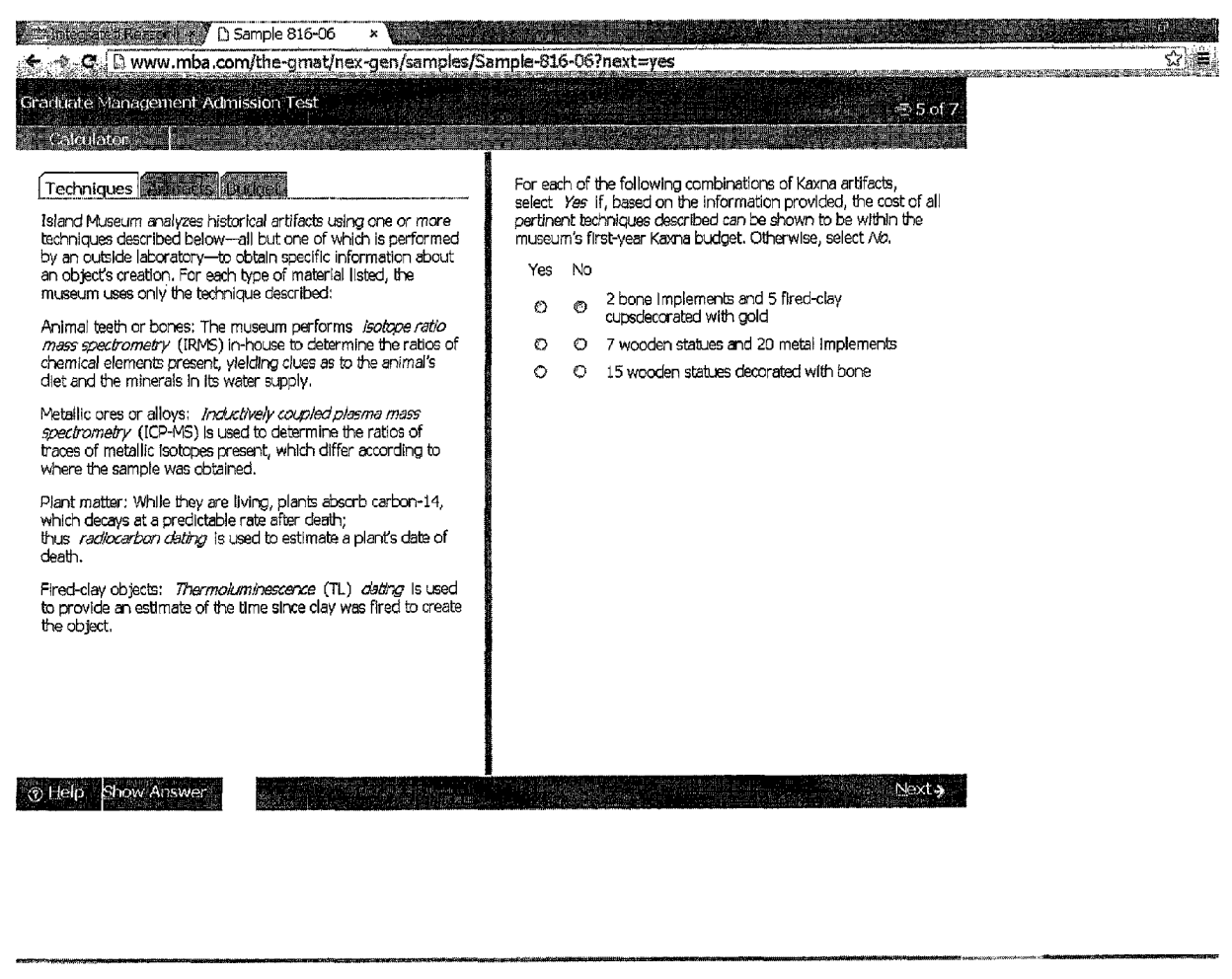

FIG. 28: This is the initial display screen for item 5 of 7. Note that the stimulus information for items 2 of 7 and 5 of 7 is the same. (The stimulus information for items 3 of 7 and 4 of 7 would also be the same in this example.) However, the statements and response opportunities differ for each item.

The table below shows a sample score tally and the corresponding raw score. The comments are for explanatory purposes only and would not appear in the table in this format. However, all of the responses would be electronically recorded. Except for item 1, the table does not reflect the succession of display screens described above.

| Item | Score 1 = credit 0 = no credit | Comments |
|---|---|---|
| 1 | 0 | Response opportunity 1 was correct. Response opportunity 2 was incorrect |
| 2 | 1 | Response opportunity 1 was correct. Response opportunity 2 was correct |
| 3 | 1 | Response opportunity 1 was correct. Response opportunity 2 was correct |
| 4 | 1 | Response opportunity 1 was correct. Response opportunity 2 was correct |
| 5 | 0 | Response opportunity 1 was incorrect. Response opportunity 2 was correct |
| 6 | 0 | Response opportunity 1 was incorrect. Response opportunity 2 was incorrect |
| 7 | 1 | Response opportunity 1 was correct. Response opportunity 2 was correct |
| 8 | 1 | Response opportunity 1 was correct. Response opportunity 2 was correct |
| 9 | 1 | Response opportunity 1 was correct. Response opportunity 2 was correct |
| 10 | 1 | Response opportunity 1 was correct. Response opportunity 2 was correct |
| 11 | 1 | Response opportunity 1 was correct. Response opportunity 2 was correct |
| 12 | 0 | Response opportunity 1 was correct. Response opportunity 2 was incorrect |
| Raw score | 8 | |

Raw scores are transformed (converted) to scaled scores using a transformation process.

The raw score of the IR section is the sum of all the item (question) scores but the raw scores are not the scores reported to the test-takers (users). The reported scale ranges from 1 to 8 and the scaled score of the IR section is derived from a conversion of the raw score.

Most high-stakes test programs utilize multiple test forms in one test administration or different test forms for different test administrations as a measure of test security. Despite the endless effort to minimize the differences in the process of assembling multiple parallel test forms, the resultant forms might vary slightly in difficulty. A statistical procedure is performed to adjust the raw scores for the minor differences in the difficulty. The statistical procedure, known as "equating," ensures that all the scores from all test forms are comparable. A conversion table for each test form resulted from the equating procedure includes a mapping of raw to scaled scores. In practice, the conversion becomes a simple table consultation to find the corresponding scaled score for a raw score.

There are a variety of equating methods. One preferred method for use in the IR section is the "equipercentile equating method." Many other methods could be used for this purpose and the present invention is not limited to this particular equating method.

Figure 29:
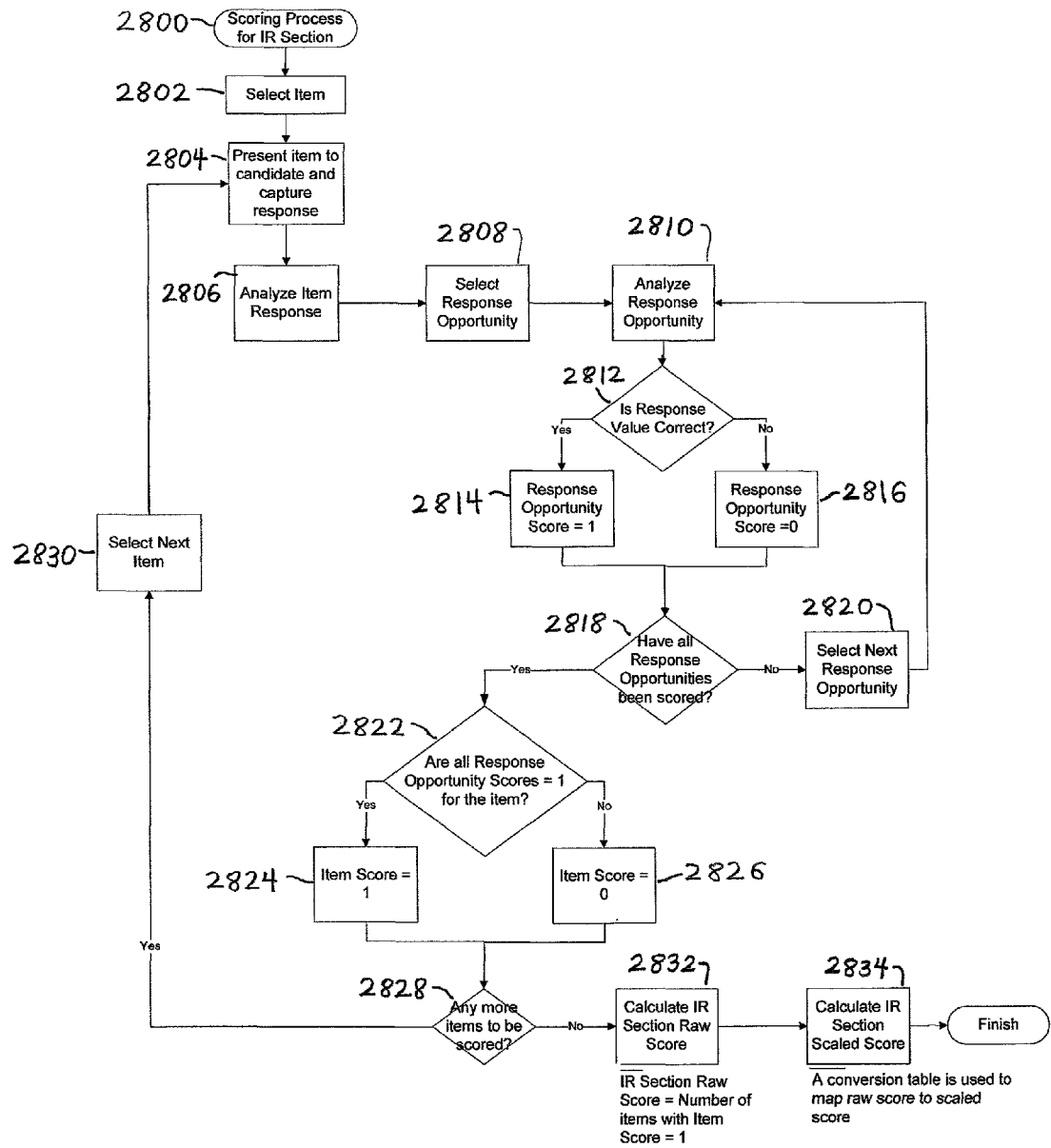
FIG. 29 is a flowchart of the Integrated Reasoning scoring process in accordance with one preferred embodiment of the present invention.

FIG. 29 is a flowchart of the IR scoring process 2800. The steps of the flowchart are implemented in a computer program environment, and are summarized as follows:

Select item—2802
Present item to candidate and capture response—2804
Analyze item response—2806
Select response opportunity—2808
Analyze response opportunity—2810
Score the response value as either correct ("1") or not correct ("0")—2812, 2814, 2816
If all response opportunities have not been scored, select the next response opportunity and score it—2818, 2820 and repeat 2806-2810

If all response opportunities have been scored, check whether all response opportunities for the item were correct and assign an item score of "1" or "0" depending upon the result —2822, 2824, 2826

If there are more items to score, select the next item and repeat the steps above —2828, 2830

If there are no more items to score, calculate the IR section raw score which is the number of items with an item score equal to "1"—2832

Calculate the IR section scaled score using a conversion table to map the raw score to the scaled score —2834

Figure 30:
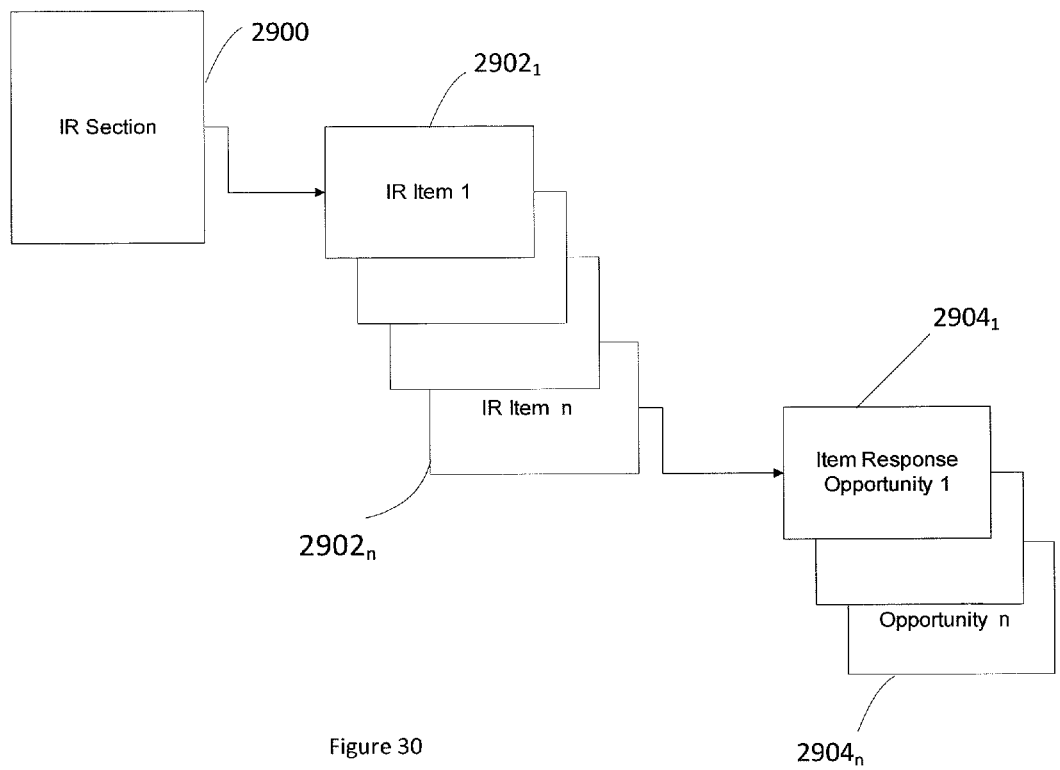
FIG. 30 show a perceptual map of the data structure of the Integrated Reasoning section in accordance with one preferred embodiment of the present invention.

FIG. 30 show a perceptual map of the data structure of the IR section 2900 which includes a plurality of IR items $2902_1$-$2902_n$ and a plurality of IR response opportunities $2904_1$-$2904_n$.

FIGS. 31-33 show the IR section data structure at the data value level. FIG. 31 shows the section data, FIG. 32 shows the item data, and FIG. 33 shows the response opportunity data.

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for presenting and scoring items which are presented in a question format that includes (i) a sortable table of data and explanatory table information, (ii) a plurality of statements related to the sortable table of data and explanatory table information, and (iii) a dichotomous-choice response opportunity for each of statements, each response opportunity being independent of each other, the method comprising for each item:
(a) presenting on a processor-controlled user interface display screen an item in the question format;
(b) receiving at a response engine the response for each of the dichotomous-choice response opportunities; and
(c) scoring the plurality of responses in a scoring engine which is in communication with the response engine and which receives the plurality of responses, the plurality of responses being scored by:
(i) determining whether the response selected for each response opportunity is correct,
(ii) assigning credit for the item only if the response for each of the response opportunities is correct, and assigning no credit for the item if at least one of the responses for a response opportunity is incorrect.

2. The method of claim 1 wherein step (a) further comprises presenting a sorting function on the processor-controlled user interface display screen to allow for sorting of the table by column values.

3. An automated system for presenting and scoring items which are presented in a question format that includes (i) a sortable table of data and explanatory table information, (ii) a plurality of statements related to the sortable table of data and explanatory table information, and (iii) a dichotomous-choice response opportunity for each of statements, each response opportunity being independent of each other, the system comprising:
(a) a processor-controlled user interface display screen for presenting items in the question format;
(b) a response engine that receives the response for each of the dichotomous-choice response opportunities of each item; and
(c) a scoring engine in communication with the response engine which receives the plurality of responses and scores the plurality of responses of each item by:
(i) determining whether the response selected for each response opportunity is correct,
(ii) assigning credit for the item only if the response for each of the response opportunities is correct, and assigning no credit for the item if at least one of the responses for a response opportunity is incorrect.

4. The system of claim 3 wherein the processor-controlled user interface display screen presents a sorting function to allow for sorting of the table by column values.

5. An automated method for presenting and scoring items which are presented in a question format that includes (i) stimulus text, (ii) a stem, and (iii) a multiple column response table including a column of response options and a plurality of multiple choice columns, each multiple choice column providing a respective response opportunity with a header related to the stem, each response opportunity being independent of each other, wherein the same column of response options are used for each of the multiple choice columns, and wherein respondents select one choice for each of the multiple choice columns as their response, the method comprising for each item:
(a) presenting on a processor-controlled user interface display screen an item in the question format;
(b) receiving at a response engine the response for each response opportunity presented on the user-interface display screen; and
(c) scoring the plurality of responses in a scoring engine which is in communication with the response engine and which receives the plurality of responses, the plurality of responses being scored by:
(i) determining whether the response selected for each response opportunity is correct,
(ii) assigning credit for the item only if the response for each of the response opportunities is correct, and assigning no credit for the item if at least one of the responses for a response opportunity is incorrect.

6. An automated system for presenting and scoring items which are presented in a question format that includes (i) stimulus text, (ii) a stem, and (iii) a multiple column response table including a column of response options and a plurality of multiple choice columns, each multiple choice column providing a respective response opportunity with a header related to the stem, each response opportunity being independent of each other, wherein the same column of response options are used for each of the multiple choice columns, and wherein respondents select one choice for each of the multiple choice columns as their response, the system comprising:
(a) a processor-controlled user interface display screen for presenting items in the question format;
(b) a response engine that receives the response for each response opportunity of each item; and
(c) a scoring engine in communication with the response engine which receives the plurality of responses and scores the plurality of responses of each item by:
(i) determining whether the response selected for each response opportunity is correct,
(ii) assigning credit for the item only if the response for each of the response opportunities is correct, and assigning no credit for the item if at least one of the responses for a response opportunity is incorrect.

7. An automated method for presenting and scoring a plurality of items in an item set which are presented in a question format that includes (i) stimulus information presented in multiple tabs, (ii) a plurality of statements related to the stimulus information, and (iii) a plurality of response opportunities, including a dichotomous-choice response opportunity for some of the statements, each response opportunity being independent of each other, wherein the plurality of items in the item set use the same stimulus information, the method comprising for each item in the item set having a dichotomous-choice response opportunity:
(a) presenting on a processor-controlled user interface display screen an item in the question format;
(b) receiving at a response engine the response for each of the dichotomous-choice response opportunities;
(c) scoring the plurality of responses in a scoring engine which is in communication with the response engine and which receives the plurality of responses, the plurality of responses being scored by:
(i) determining whether the response selected for each response opportunity is correct,
(ii) assigning credit for the item only if the response for each of the response opportunities is correct, and assigning no credit for the item if at least one of the responses for a response opportunity is incorrect.

8. The method of claim 7 wherein the stimulus information is selected from the group consisting of text, graphics and tables.

9. An automated system for presenting and scoring a plurality of items in an item set which are presented in a question format that includes (i) stimulus information presented in multiple tabs, (ii) a plurality of statements related to the stimulus information; (iii) a plurality of response opportunities, including a dichotomous-choice response opportunity for some of the statements, each response opportunity being independent of each other, wherein the plurality of items in the item set use the same stimulus information, the system comprising:
- (a) a processor-controlled user interface display screen for presenting items in the question format having a dichotomous-choice response opportunity;
- (b) a response engine that receives the response for each response opportunity of each item in the item set having a dichotomous-choice response opportunity; and
- (c) a scoring engine in communication with the response engine which receives the plurality of responses and scores the plurality of responses of each item in the item set having a dichotomous-choice response opportunity by:
  - (i) determining whether the response selected for each response opportunity is correct,
  - (ii) assigning credit for the item only if the response for each of the response opportunities is correct, and assigning no credit for the item if at least one of the responses for a response opportunity is incorrect.

10. The system of claim 9 wherein the stimulus information is selected from the group consisting of text, graphics and tables.

11. An automated method for presenting and scoring items which are presented in integrated reasoning question formats that include:
- a first question format having (i) a graphic representation of data or information, (ii) one or more statements which relate to the graphical representation, and (iii) a plurality of response opportunities in the form of pull-down menus embedded within the one or more statements, each of the pull-down menus presenting a plurality of responses to a response opportunity;
- a second question format having (i) a sortable table of data and explanatory table information, (ii) a plurality of statements related to the sortable table of data and explanatory table information, and (iii) a dichotomous-choice response opportunity for each of statements;
- a third question format having (i) stimulus text, (ii) a stem, and (iii) a multiple column response table including a column of response options and a plurality of multiple choice columns, each multiple choice column providing a respective response opportunity with a header related to the stem, wherein the same column of response options are used for each of the multiple choice columns, and wherein respondents select one choice for each of the multiple choice columns as their response; and
- a fourth question format having a plurality of items in an item set which are presented in a question format that includes (i) stimulus information presented in multiple tabs, (ii) a plurality of statements related to the stimulus information, and (iii) a plurality of response opportunities, including a dichotomous-choice response opportunity for some of the statements, wherein the plurality of items in the item set use the same stimulus information,
- each response opportunity being independent of each other, the method comprising for each item in the first, second and third question format, and for each item in the item set of the fourth question format:
  - (a) presenting on a processor-controlled user interface display screen an item in the question format;
  - (b) receiving at a response engine the response for each response opportunity presented on the user interface display screen; and
  - (c) scoring the plurality of responses in a scoring engine which is in communication with the response engine and which receives the plurality of responses, the plurality of responses being scored by:
    - (i) determining whether the response selected for each response opportunity is correct, and
    - (ii) assigning credit for the item only if the response for each of the response opportunities is correct, and assigning no credit for the item if at least one of the responses for a response opportunity is incorrect.

12. An automated system for presenting and scoring items which are presented in integrated reasoning question formats that include:
- a first question format having (i) a graphic representation of data or information, (ii) one or more statements which relate to the graphical representation, and (iii) a plurality of response opportunities in the form of pull-down menus embedded within the one or more statements, each of the pull-down menus presenting a plurality of responses to a response opportunity;
- a second question format having (i) a sortable table of data and explanatory table information, (ii) a plurality of statements related to the sortable table of data and explanatory table information, and (iii) a dichotomous-choice response opportunity for each of statements;
- a third question format having (i) stimulus text, (ii) a stem, and (iii) a multiple column response table including a column of response options and a plurality of multiple choice columns, each multiple choice column providing a respective response opportunity with a header related to the stem, wherein the same column of response options are used for each of the multiple choice columns, and wherein respondents select one choice for each of the multiple choice columns as their response; and
- a fourth question format having a plurality of items in an item set which are presented in a question format that includes (i) stimulus information presented in multiple tabs, (ii) a plurality of statements related to the stimulus information, and (iii) a plurality of response opportunities, including a dichotomous-choice response opportunity for some of the statements, wherein the plurality of items in the item set use the same stimulus information,
- each response opportunity being independent of each other, the system comprising:
- (a) a processor-controlled user interface display screen for presenting items in the question format;
- (b) a response engine that receives the response for each response opportunity of each item; and
- (c) a scoring engine in communication with the response engine which receives the plurality of responses and scores the plurality of responses of each item by:
  - (i) determining whether the response selected for each response opportunity is correct, and
  - (ii) assigning credit for the item only if the response for each of the response opportunities is correct, and assigning no credit for the item if at least one of the responses for a response opportunity is incorrect.

* * * * *